(12) United States Patent
Shike et al.

(10) Patent No.: US 10,344,456 B2
(45) Date of Patent: Jul. 9, 2019

(54) CONSTRUCTION MANAGEMENT SYSTEM, CONSTRUCTION MANAGEMENT METHOD, AND MANAGEMENT DEVICE

(71) Applicant: Komatsu Ltd., Tokyo (JP)

(72) Inventors: Chikashi Shike, Tokyo (JP); Ichiro Nakano, Tokyo (JP); Akinori Onodera, Yokohama (JP); Hiroyoshi Yamaguchi, Tokyo (JP); Taiki Sugawara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/752,677

(22) PCT Filed: Oct. 5, 2016

(86) PCT No.: PCT/JP2016/079708
§ 371 (c)(1),
(2) Date: Feb. 14, 2018

(87) PCT Pub. No.: WO2017/061518
PCT Pub. Date: Apr. 13, 2017

(65) Prior Publication Data
US 2018/0245311 A1 Aug. 30, 2018

(30) Foreign Application Priority Data
Oct. 5, 2015 (JP) .................. 2015-198081

(51) Int. Cl.
*E02F 9/20* (2006.01)
*E02F 9/26* (2006.01)
(Continued)

(52) U.S. Cl.
CPC .............. *E02F 9/2045* (2013.01); *E02F 9/20* (2013.01); *E02F 9/261* (2013.01); *G01B 11/245* (2013.01);
(Continued)

(58) Field of Classification Search
CPC ........... E02F 9/2045; E02F 9/20; E02F 9/261; G01B 11/245; G01C 3/06; G01C 11/06; H04B 13/00
(Continued)

(56) References Cited

U.S. PATENT DOCUMENTS 5,935,192 A * 8/1999 Henderson ............ E02F 9/2045
701/408
8,768,287 B2 7/2014 Punz
(Continued)

FOREIGN PATENT DOCUMENTS

JP 2002-328022 A 11/2002
JP 2002-352224 A 12/2002
(Continued)

OTHER PUBLICATIONS

Office Action dated Jul. 20, 2018, issued for the Australian Patent Application No. 2016336321.
(Continued)

*Primary Examiner* — Yazan A Soofi
(74) *Attorney, Agent, or Firm* — Locke Lord LLP

(57) ABSTRACT

A construction management system includes: an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

9 Claims, 21 Drawing Sheets

(51) Int. Cl.
  *G01B 11/245* (2006.01)
  *G01C 3/06* (2006.01)
  *G01C 11/06* (2006.01)
  *H04N 13/00* (2018.01)
  *H04N 7/18* (2006.01)
  *H04N 13/243* (2018.01)
  *H04N 13/239* (2018.01)
(52) U.S. Cl.
  CPC .............. *G01C 3/06* (2013.01); *G01C 11/06* (2013.01); *H04N 13/00* (2013.01); *H04N 7/18* (2013.01); *H04N 13/239* (2018.05); *H04N 13/243* (2018.05)
(58) Field of Classification Search
  USPC ............................................. 701/99
  See application file for complete search history.

(56) References Cited

U.S. PATENT DOCUMENTS

| 8,768,587 | B2 | 7/2014 | Wulf et al. | |
|---|---|---|---|---|
| 2003/0004645 | A1* | 1/2003 | Kochi | G01C 15/00 |
| | | | | 702/1 |
| 2013/0222573 | A1* | 8/2013 | Onuma | E02F 9/24 |
| | | | | 348/82 |
| 2014/0203959 | A1* | 7/2014 | Kriel | G01S 13/867 |
| | | | | 342/52 |
| 2015/0094953 | A1* | 4/2015 | Montgomery | G06K 9/00671 |
| | | | | 701/514 |
| 2016/0024757 | A1 | 1/2016 | Nomura et al. | |
| 2018/0162011 | A1* | 6/2018 | Friend | B33Y 40/00 |

FOREIGN PATENT DOCUMENTS

| JP | 2013-036243 A | 2/2013 |
|---|---|---|
| JP | 2014-153351 | 8/2014 |
| JP | 2014-205955 A | 10/2014 |
| JP | 2015-102466 A | 6/2015 |

OTHER PUBLICATIONS

International Search Report dated Dec. 20, 2016, issued for PCT/JP2016/079708.
Office Action dated Mar. 8, 2019, issued in the corresponding U.S. Appl. No. 16/121,884.

\* cited by examiner

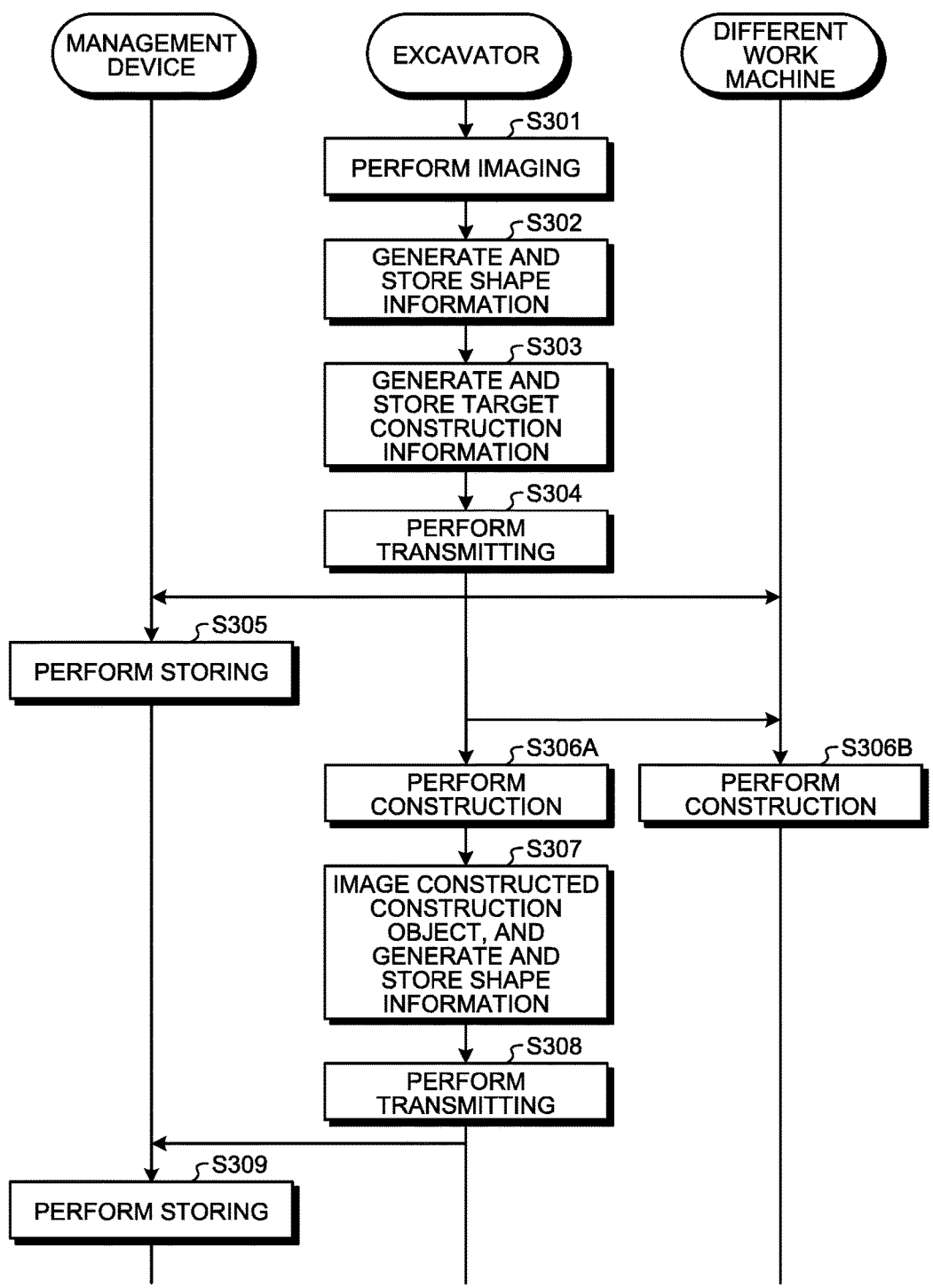

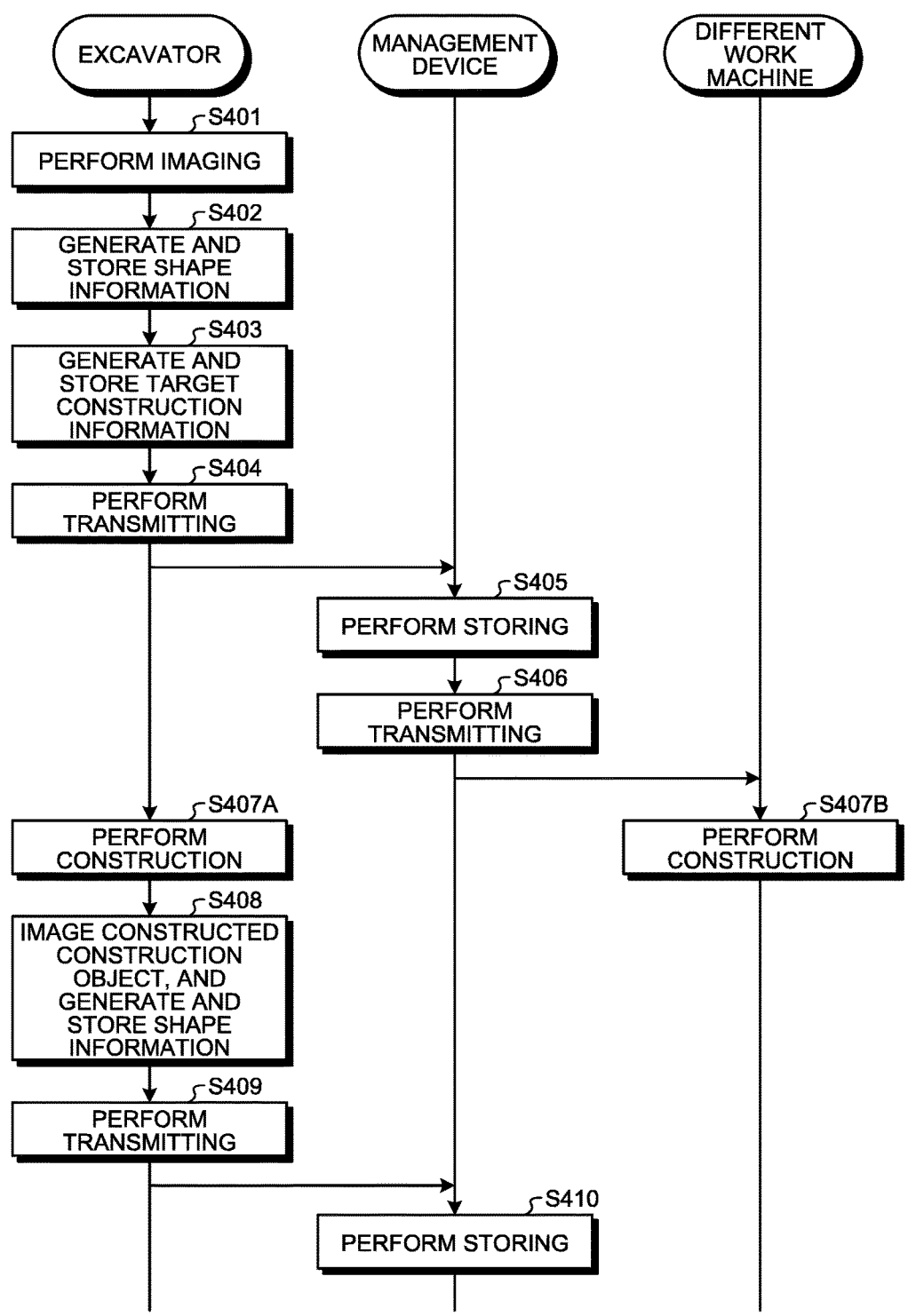

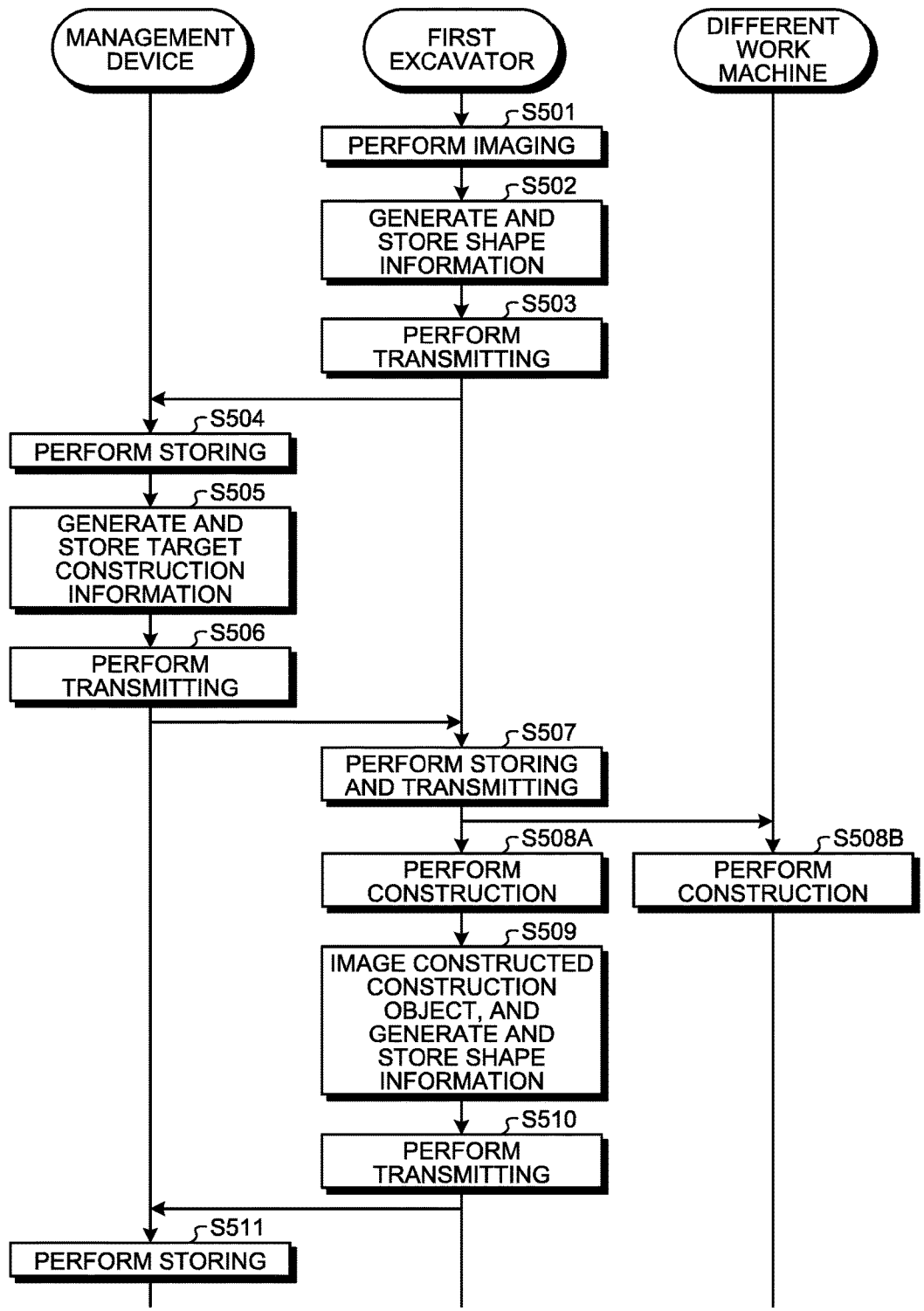

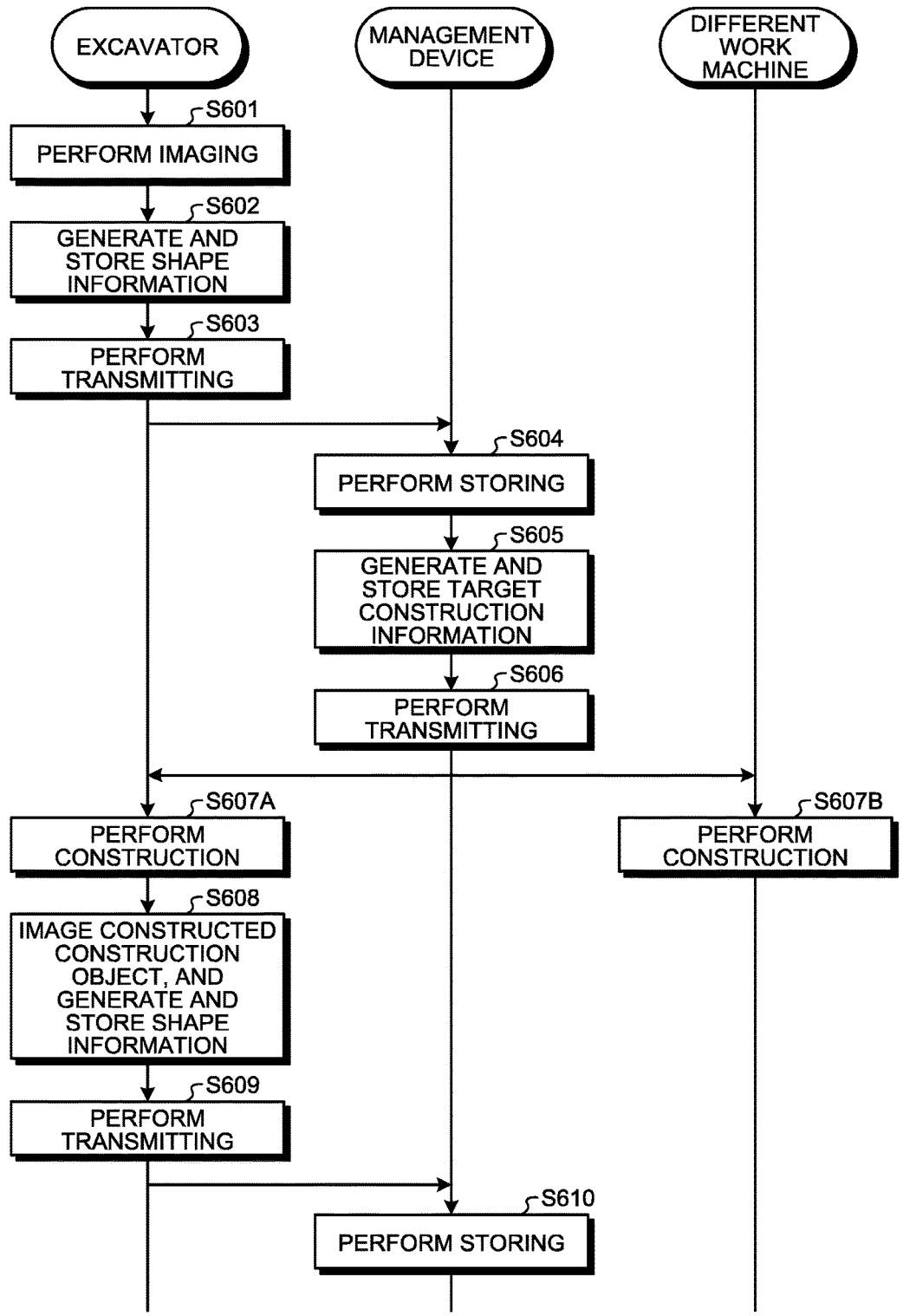

CONSTRUCTION MANAGEMENT SYSTEM, CONSTRUCTION MANAGEMENT METHOD, AND MANAGEMENT DEVICE

FIELD

The present invention relates to a construction management system, a construction management method, and a management device.

BACKGROUND

There is a work machine having an imaging device. Patent Literature 1 discloses a technology in which image data of a construction plan is created on the basis of construction plan data stored in a storage unit and positional information on a stereo camera, the image data of the construction plan and current image data imaged by the stereo camera are superimposed, and a superimposed composite image is three-dimensionally displayed on a three-dimensional display device.

CITATION LIST

Patent Literature

Patent Literature 1: Japanese Patent Application Laid-open No. 2013-036243 A

SUMMARY

Technical Problem

It is preferable that every work machine working in a construction site has a detecting device, but it may be difficult for all of work machines to have a detecting device due to an allocation problem of work vehicles and the like. Patent Literature 1 neither describes nor suggests anything about a case where both a work machine having a detecting device and a work machine not having a detecting device exist mixed, and there is room for improvement in this point.

The present invention is directed to managing construction conditions of a construction site where a work machine having a detecting device and a work machine not having a detecting device exist mixed.

Solution to Problem

According to an aspect of the present invention, a construction management system comprises: an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

It is preferable that the construction management system, further comprises: a communication unit configured to transmit information on construction, the information including at least one of the shape information and information obtained from the shape information, wherein the communication unit is configured to transmit the information on construction to a work machine other than the work machine.

It is preferable that the communication unit is configured to transmit the information on construction to a management device configured to communicate with the work machine.

It is preferable that the object includes at least a construction planned portion different from a construction planned portion by the work machine, and a constructed portion different from a constructed portion by the work machine.

According to an aspect of the present invention, a construction management system comprises: an object detecting unit mounted on a work machine and configured to detect an object and output information on the object; and a shape detecting unit configured to output shape information indicating a three-dimensional shape of the object by using the information on the object detected by the object detecting unit, wherein the object includes at least one of a construction planned portion different from a construction planned portion by the work machine and a constructed portion different from a constructed portion by the work machine.

It is preferable that a removed soil amount or a banked soil amount is obtained on the basis of pieces of the shape information obtained at different times.

It is preferable that the shape detecting unit includes at least two imaging devices.

According to an aspect of the present invention, a construction management system comprises: an object detecting unit mounted on a work machine and configured to detect an object and output information on the object; and a shape detecting unit configured to output shape information indicating a three-dimensional shape of the object by using the information on the object detected by the object detecting unit, wherein the object includes at least one of a construction planned portion and a constructed portion by a unit other than the work machine.

It is preferable that a removed soil amount or a banked soil amount by a different work machine is obtained on the basis of pieces of the shape information obtained at different times.

It is preferable that shape information on an entire construction site is generated by using at least one of a construction result by the work machine, a construction result by a different work machine, and a construction result by neither the work machine nor the different work machine.

According to an aspect of the present invention, a construction management method comprises: detecting an object in a construction site from a predetermined position of a work machine; outputting shape information indicating a three-dimensional shape of the detected object; attaching, to the shape information, time information indicating a time when the object is detected; and generating current state information on a construction site on the basis of the shape information to which a latest piece of the time information is attached.

It is preferable that the construction management method, comprises: detecting the object from a predetermined position of a work machine, wherein the object includes at least one of a construction planned portion different from a construction planned portion by the work machine and a constructed portion different from a constructed portion by the work machine.

According to an aspect of the present invention, a construction management method comprises: detecting an object in a construction site from a predetermined position of a work machine; and outputting the detected shape information, wherein the object includes at least one of a construction planned portion different from a construction planned portion by the work machine and a constructed portion different from a constructed portion by the work machine.

According to an aspect of the present invention, a management device is configured to: acquire shape information indicating a three-dimensional shape of an object detected by an object detecting unit mounted on a work machine, the object being located in a construction site, and time information indicating a time when the object is detected; and generate current state information on the construction site on the basis of the shape information to which a latest piece of the time information is attached out of pieces of the time information indicating times when the object is detected.

Advantageous Effects of Invention

The present invention can manage the construction conditions of a construction site where a work machine having a detecting device and a work machine not having a detecting device exist mixed.

BRIEF DESCRIPTION OF DRAWINGS

FIG. 24 is a flowchart illustrating exemplary processing of a shape measuring method and a construction management method according to a third embodiment.

FIG. 25 is a flowchart illustrating exemplary processing of a shape measuring method and a construction management method according to a first modified example of the third embodiment.

FIG. 26 is a flowchart illustrating exemplary processing of a shape measuring method and a construction management method according to a fourth embodiment.

FIG. 27 is a flowchart illustrating exemplary processing of a shape measuring method and a construction management method according to a first modified example of the fourth embodiment.

DESCRIPTION OF EMBODIMENTS

Modes (embodiments) to implement the present invention will be described in detail with reference to the drawings.

First Embodiment

<General Structure of Excavator>

Figure 1:
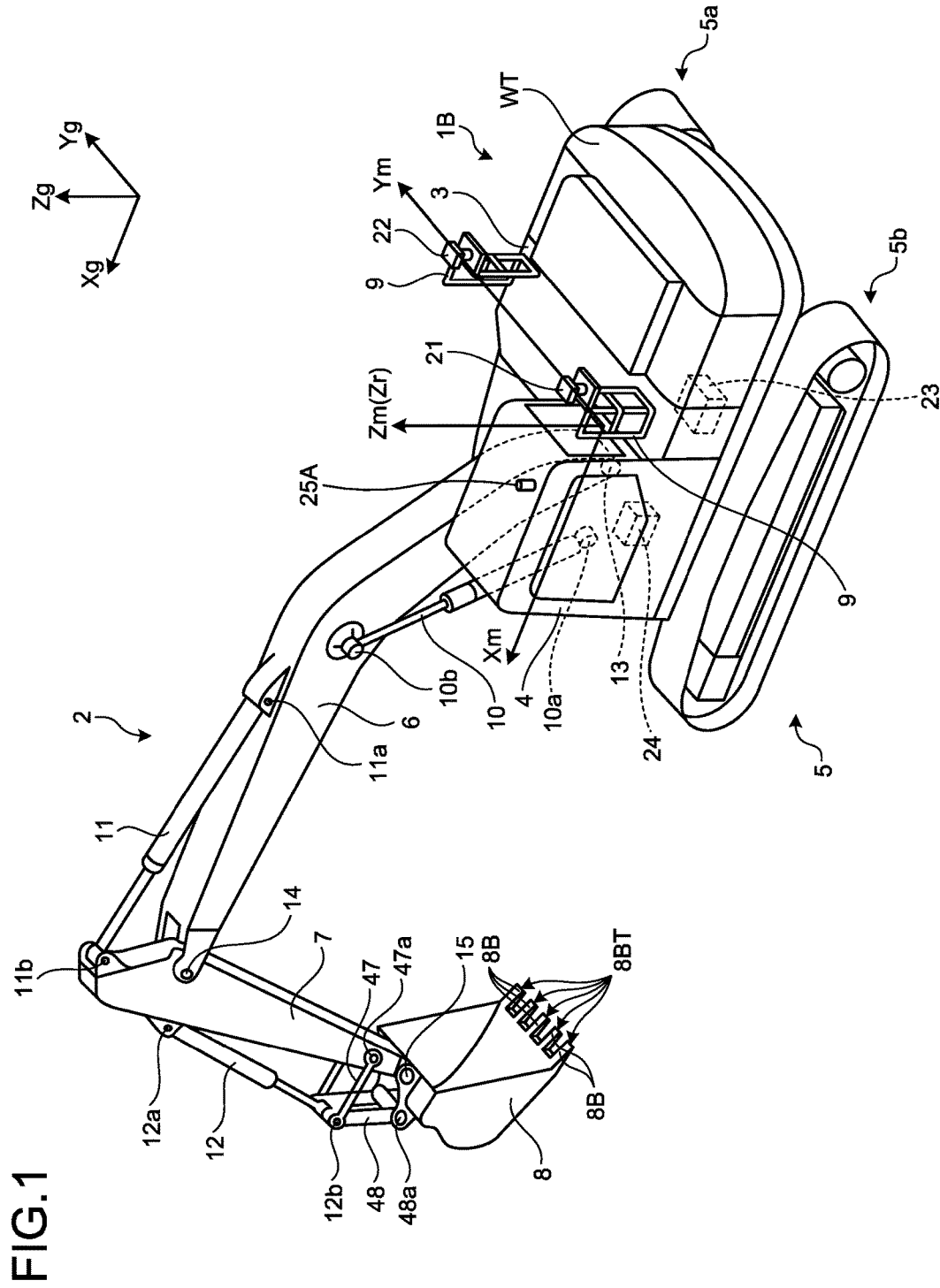
FIG. 1 is a perspective view illustrating an excavator 1 including a control system of an imaging device according to a first embodiment.
Figure 2:
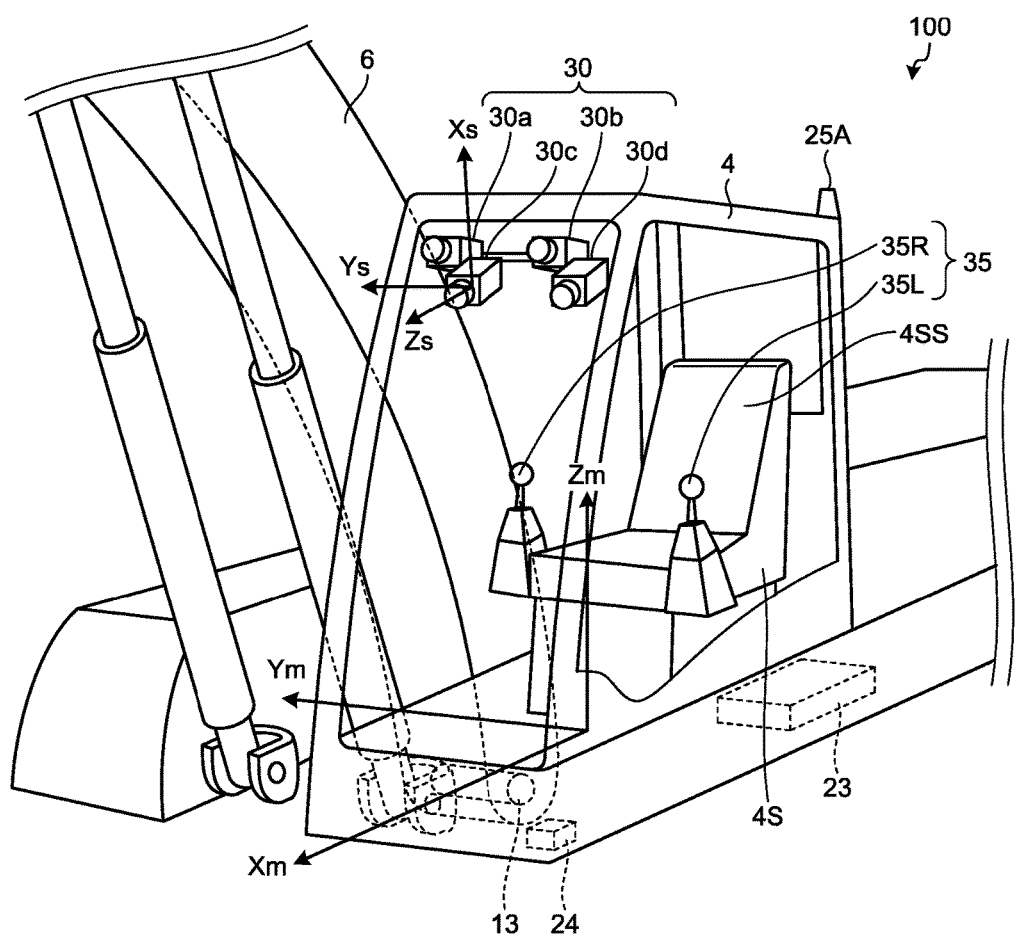
FIG. 2 is a perspective view illustrating a peripheral area of an operator's seat of the excavator according to the first embodiment.

FIG. 1 is a perspective view illustrating an excavator 1 including a control system of an imaging device according to a first embodiment. FIG. 2 is a perspective view illustrating a peripheral area of an operator's seat of the excavator 1 according to the first embodiment. The excavator 1 that is a work machine has a vehicle body 1B and a work unit 2. The vehicle body 1B has a swing body 3, an operator's compartment 4, and a traveling body 5. The swing body 3 is mounted on the traveling body 5 in a swingable manner while setting a swing center axis Zr as a center. The swing body 3 houses devices such as a hydraulic pump and an engine.

The swing body 3 is swung with the work unit 2 mounted thereon. A hand rail 9 is mounted on an upper portion of the swing body 3. Antennas 21, 22 are mounted on the hand rail 9. The antennas 21, 22 are antennas for real time kinematic-global navigation satellite systems (RTK-GNSS). The antennas 21, 22 are arranged apart from each other at a predetermined interval in a Ym-axis direction of a vehicle body coordinate system (Xm, Ym, Zm). The antennas 21, 22 each receive a GNSS radio wave and output a signal corresponding to the GNSS radio wave. The antennas 21, 22 may be antennas for a global positioning system (GPS).

The operator's compartment 4 is disposed at a front portion of the swing body 3. An antenna 25A for communication is mounted on a roof of the operator's compartment 4. The traveling body 5 has crawlers 5a, 5b. The excavator 1 travels by rotation of the crawlers 5a, 5b.

The work unit 2 is mounted on a front portion of the vehicle body 1B, and includes a boom 6, an arm 7, a bucket 8 serving as a work tool, a boom cylinder 10, an arm cylinder 11, and a bucket cylinder 12. According to an embodiment, a front side of the vehicle body 1B is a directional side directed to an operating device 35 from a backrest 4SS of an operator's seat 4S illustrated in FIG. 2. A rear side of the vehicle body 1B is a directional side directed to the backrest 4SS of the operator's seat 4S from the operating device 35. The front portion of the vehicle body 1B is a portion on the front side of the vehicle body 1B, and is a portion on an opposite side of a counterweight WT of the vehicle body 1B. The operating device 35 is a device to operate the work unit 2 and the swing body 3, and has a right lever 35R and a left lever 35L.

A proximal end portion of the boom 6 is rotatably mounted on the front portion of the vehicle body 1B via a boom pin 13. Specifically, the boom pin 13 corresponds to a rotary center of the boom 6 with respect to the swing body 3. A proximal end portion of the arm 7 is rotatably mounted on a distal end portion of the boom 6 via an arm pin 14. Specifically, the arm pin 14 corresponds to a rotary center of the arm 7 with respect to the boom 6. The bucket 8 is rotatably mounted on a distal end portion of the arm 7 via a bucket pin 15. Specifically, the bucket pin 15 corresponds to a rotary center of the bucket 8 with respect to the arm 7.

The respective boom cylinder 10, arm cylinder 11, and bucket cylinder 12 illustrated in FIG. 1 are hydraulic cylinders driven by hydraulic pressure. A proximal end portion of the boom cylinder 10 is rotatably mounted on the swing body 3 via a boom cylinder foot pin 10a. A distal end portion of the boom cylinder 10 is rotatably mounted on the boom 6 via a boom cylinder top pin 10b. The boom cylinder 10 is extended/contracted by hydraulic pressure, thereby driving the boom 6.

A proximal end portion of the arm cylinder 11 is rotatably mounted on the boom 6 via an arm cylinder foot pin 11a. A distal end portion of the arm cylinder 11 is rotatably mounted on the arm 7 via an arm cylinder top pin 11b. The arm cylinder 11 is extended/contracted by hydraulic pressure, thereby driving the arm 7.

A proximal end portion of the bucket cylinder 12 is rotatably mounted on the arm 7 via a bucket cylinder foot pin 12a. A distal end portion of the bucket cylinder 12 is rotatably mounted on one end of a first link member 47 and one end of a second link member 48 via a bucket cylinder top pin 12b. The other end of the first link member 47 is rotatably mounted on the distal end portion of the arm 7 via a first link pin 47a. The other end of the second link member 48 is rotatably mounted on the bucket 8 via a second link pin 48a. The bucket cylinder 12 is extended/contracted by hydraulic pressure, thereby driving the bucket 8.

The bucket 8 has a plurality of blades 8B. The plurality of blades 8B is aligned in a width direction of the bucket 8. An edge of blade 8B is a blade edge 8BT. The bucket 8 is an exemplary work tool. The work tool is not limited to the bucket 8. The work tool may be, for example, a tilt bucket having a single blade, a slope bucket, a rock drilling attachment including a rock drilling chip, or a work tool other than these.

The swing body 3 has a position detecting device 23 and an inertial measurement unit (IMU) 24 that is an exemplary posture detecting device. The position detecting device 23 receives signals from the antennas 21, 22. The position detecting device 23 detects and outputs current positions of the antennas 21, 22 in a global coordinate system (Xg, Yg, Zg) and an azimuth direction of the swing body 3 by using the signals acquired from the antennas 21, 22. The azimuth direction of the swing body 3 indicates an orientation of the swing body 3 in the global coordinate system. The orientation of the swing body 3 can be represented by, for example, an orientation in a front-rear direction of the swing body 3 around a Zg-axis in the global coordinate system. An azimuth angle is a rotational angle of a reference axis in the front-rear direction of the swing body 3 around the Zg-axis in the global coordinate system. The azimuth direction of the swing body 3 is represented by the azimuth angle. In the present embodiment, the position detecting device 23 calculates the azimuth angle from relative positions of the two antennas 21, 22.

<Imaging Device>

As illustrated in FIG. 2, the excavator 1 has a plurality of imaging devices 30a, 30b, 30c, 30d inside the operator's compartment 4. The plurality of imaging devices 30a, 30b, 30c, 30d is exemplary detecting devices to detect a shape of an object. In the following, in a case of not differentiating each one of the plurality of imaging devices 30a, 30b, 30c, 30d, each imaging device will be referred to as an imaging device 30. Among the plurality of imaging devices 30, the imaging device 30a and the imaging device 30c are arranged on the work unit 2 side. A type of the imaging device 30 is not limited, but according to the embodiment, an imaging device including a couple charged device (CCD) image sensor or a complementary metal oxide semiconductor (CMOS) image sensor is used.

As illustrated in FIG. 2, the imaging device 30a and the imaging device 30b are arranged apart from each other at a predetermined interval inside the operator's compartment 4, and oriented in a same direction or different directions. The imaging device 30c and the imaging device 30d are arranged apart from each other at a predetermined interval inside the operator's compartment 4, and oriented in a same direction or different directions. Two of the plurality of imaging devices 30a, 30b, 30c, 30d are paired and constitutes a stereo camera. In the embodiment, a stereo camera is formed by pairing the imaging devices 30a, 30b, and another stereo camera is formed by pairing the imaging devices 30c, 30d. According to the embodiment, the imaging device 30a and the imaging device 30b are oriented upward, and the imaging device 30c and the imaging device 30d are oriented downward. At least the imaging device 30a and the imaging device 30c are oriented to the front side of the excavator 1, in the embodiment, the front side of the swing body 3. The imaging device 30b and the imaging device 30d may also be arranged in a manner oriented slightly toward the work unit 2, specifically, slightly oriented to the side of the imaging device 30a and the imaging device 30c.

In the embodiment, the excavator 1 has the four imaging devices 30, but the number of imaging devices 30 included in the excavator 1 may be at least two, and not limited to four. The reason is that the excavator 1 performs stereo photographing for an object by forming the stereo camera with at least one pair of the imaging devices 30.

The plurality of imaging devices 30a, 30b, 30c, 30d is arranged on the front and upper sides inside the operator's compartment 4. The upper side represents a directional side orthogonal to a ground contact surface of the crawlers 5a, 5b included in the excavator 1 and also directed away from the ground contact surface. The ground contact surface of the crawlers 5a, 5b is a flat surface in a portion contacted by at least one of the crawlers 5a, 5b and defined by at least three points not located on a same line. The lower side represents a directional side opposite to the upper side, specifically, the directional side orthogonal to the ground contact surface of the crawlers 5a, 5b and also directed close to the ground contact surface.

The plurality of imaging devices 30a, 30b, 30c, 30d performs stereo photographing for an object existing in front of the vehicle body 1B of the excavator 1. The object is, for example, a construction object to be constructed by at least one of the excavator 1, a work machine of the excavator 1, and a worker who works in a construction site. The plurality of imaging devices 30a, 30b, 30c, 30d detects the object from predetermined positions of the excavator 1, in the present embodiment, from the front and upper sides inside the operator's compartment 4. In the present embodiment, the object is three-dimensionally measured by using results of stereo photographing performed by at least one pair of the imaging devices 30. Setting places of the plurality of imaging devices 30a, 30b, 30c, 30d are not limited to the front and upper sides inside the operator's compartment 4.

Among the plurality of imaging devices 30a, 30b, 30c, 30d, for example, the imaging device 30c is set as a reference thereof. Each of the four plural imaging devices 30a, 30b, 30c, 30d has a coordinate system. Such a coordinate system will be suitably referred to as an imaging device coordinate system. In FIG. 2, only the coordinate system (xs, ys, zs) of the reference imaging device 30c is illustrated. An origin in each of the imaging device coordinate systems is a center point in each of the imaging devices 30a, 30b, 30c, 30d.

In the present embodiment, each of the imaging devices 30a, 30b, 30c, 30d has an imaging range larger than a range that can be constructed by the work unit 2 of the excavator 1. With having such a range, each of the imaging devices 30a, 30b, 30c, 30d can surely perform stereo photographing for an object in the range that can be excavated by the work unit 2.

The above-described vehicle body coordinate system (Xm, Ym, Zm) is a coordinate system in which a fixed origin in the vehicle body 1B, in the present embodiment, in the swing body 3 is set as a reference. In the embodiment, the origin of the vehicle body coordinate system (Xm, Ym, Zm) is, for example, a center of a swing circle of the swing body 3. The center of the swing circle is located on the swing center axis Zr of the swing body 3. The Zm-axis in the vehicle body coordinate system (Xm, Ym, Zm) is an axis to be the swing center axis Zr of the swing body 3, and the Xm-axis is an axis extending in the front-rear direction of the swing body 3 and orthogonal to the Zm-axis. The Xm-axis is a reference axis in the front-rear direction of the swing body 3. The Ym-axis is an axis orthogonal to the Zm-axis and the Xm-axis and extending in a width direction of the swing body 3. The above-described global coordinate system (Xg, Yg, Zg) is a coordinate system to be measured by the GNSS and also is a coordinate system in which an origin fixed in the earth is set as a reference.

The vehicle body coordinate system is not limited to the example of the present embodiment. The vehicle body coordinate system may have a center of the boom pin 13 as an origin of the vehicle body coordinate system, for example. The center of the boom pin 13 is a center of a cross-section obtained by cutting the boom pin 13 along a plane orthogonal to an extending direction of the boom pin 13, and also is a center in the extending direction of the boom pin 13.

<Control System of Work Machine and Construction Management System>

Figure 3:
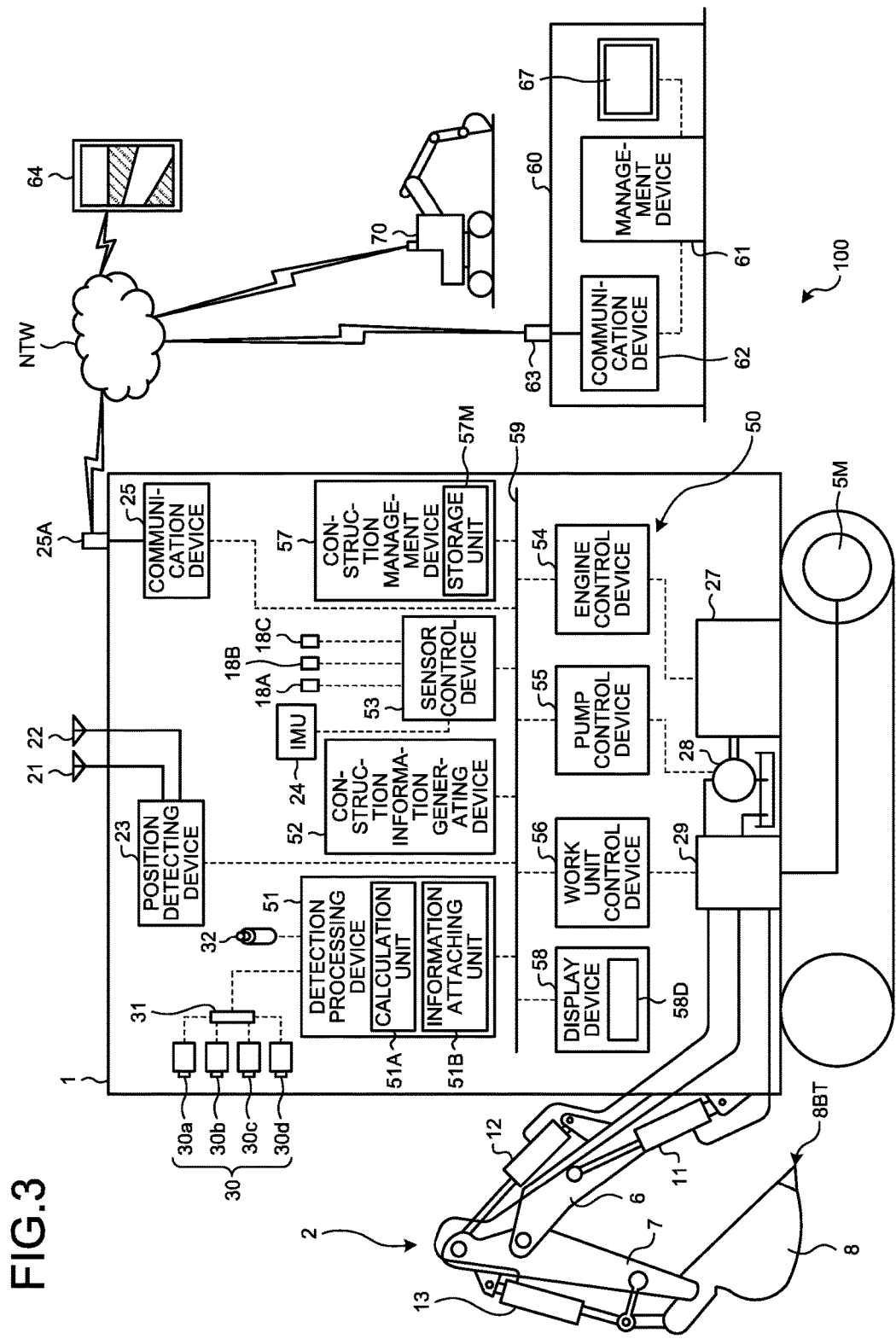
FIG. 3 is a diagram illustrating a control system of a work machine and a construction management system according to an embodiment.

FIG. 3 is a diagram illustrating a control system 50 of a work machine and a construction management system 100 according to an embodiment. Device configurations of the control system 50 and the management system 100 illustrated in FIG. 3 are merely examples and not limited to the exemplary device configurations of the present embodiment. For example, various devices included in the control system 50 may not be independent from each other. In other words, functions of a plurality of devices may also be implemented by one device.

The control system 50 of the work machine (hereinafter, suitably referred to as the control system 50) includes a plurality of imaging devices 30a, 30b, 30c, 30d and various control devices in order to control the excavator 1. These devices are provided in the vehicle body 1B of the excavator 1 illustrated in FIG. 1, in the present embodiment, in the swing body 3. In the present embodiment, the control system 50 corresponds to a shape measuring system.

The various control devices included in the control system 50 include a detection processing device 51, a construction information generating device 52, a sensor control device 53, an engine control device 54, a pump control device 55, and a work unit control device 56 illustrated in FIG. 3. Besides, the control system 50 has a construction management device 57 to manage a state of the excavator 1 and construction conditions by the excavator 1. Furthermore, the control system 50 includes a display device 58 to display information on the excavator 1 or display a construction guidance image on a screen 58D, and a communication device 25 to communicate with at least one of a management device 61 of a management facility 60 existing outside the excavator 1, a different work machine 70, a mobile terminal device 64, and a device other than the management device 61 of the management facility 60. Furthermore, the control system 50 has the position detecting device 23 and the IMU 24 that is an example of a posture detecting device in order to acquire information necessary to control the excavator 1. In the present embodiment, the control system 50 is at least required to have the detection processing device 51 and the construction information generating device 52.

In the embodiment, the detection processing device 51, the construction information generating device 52, the sensor control device 53, the engine control device 54, the pump control device 55, the work unit control device 56, the construction management device 57, the display device 58, the position detecting device 23, and the communication device 25 are connected to a signal line 59, and communicate with one another. According to the first embodiment, a communication standard using the signal line 59 is a controller area network (CAN), but not limited thereto. In the following, the term "excavator 1" may represent various kinds of electronic devices such as the detection processing device 51 and construction information generating device 52 included in the excavator 1.

Figure 4:
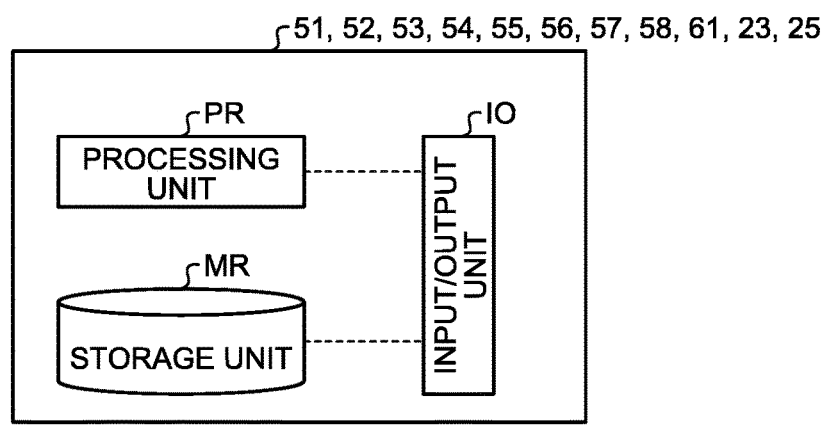
FIG. 4 is a diagram illustrating an exemplary hardware configuration in each of various kinds of apparatuses included in the excavator and a management device.

FIG. 4 is a diagram illustrating an exemplary hardware configuration in each of various kinds of apparatuses included in the excavator 1 and the management device 61. In the embodiment, the detection processing device 51, construction information generating device 52, sensor control device 53, engine control device 54, pump control device 55, work unit control device 56, construction management device 57, display device 58, position detecting device 23, and communication device 25 included in the excavator 1, and management device 61 each has a processing unit PR, a storage unit MR, and an input/output unit IO as illustrated in FIG. 4. The processing unit PR is implemented by, for example, a processor such as a central processing unit (CPU) and a memory.

As the storage unit MR, used is at least one of a non-volatile or volatile semiconductor memory such as a random access memory (RAM), a read only memory (ROM), a flash memory, an erasable programmable read only memory (EPROM), and an electrically erasable programmable read only memory (EEPROM), a magnetic disk, a flexible disk, and a magnetic optical disk.

The input/output unit IO is an interface circuit for the excavator 1 or the management device 61 to transmit and receive data, signals, and the like to and from other apparatuses and the internal devices. The internal devices also include the signal line 59 inside the excavator 1.

Each of the excavator 1 and the management device 61 stores, in the storage unit MR, a computer program to cause the processing unit PR to implement an own function. Each of the processing unit PR of the excavator 1 and the processing unit PR of the management device 61 implements the function of each device by reading and executing the computer program from each storage unit MR. The various kinds of electronic devices and apparatuses included in the excavator 1 and the management device 61 may be each implemented by dedicated hardware, or the respective functions may be implemented by cooperation of a plurality of processing circuits. Next, various kinds of electronic devices and apparatuses included in the excavator 1 will be described.

The detection processing device 51 applies image processing by a stereo method to one pair of images of an object imaged by at least one pair of imaging devices 30, thereby achieving a position of the object, specifically, a coordinate of the object in a three-dimensional coordinate system. Thus, the detection processing device 51 can three-dimensionally measure the object by using one pair of images obtained by imaging a same object with at least one pair of imaging devices 30. Specifically, at least the one pair of the imaging devices 30 and the detection processing device 51 three-dimensionally measure the object by the stereo method. The image processing by the stereo method is a method to obtain a distance to the object from two images obtained by observing the same object from two different imaging devices 30. The distance to the object is represented by, for example, a range image in which distance information to the object is visualized by shading.

The detection processing device 51 acquires information on the object detected by at least the one pair of imaging devices 30 and obtains, from the information on the object, shape information indicating a three-dimensional shape of the object. In the present embodiment, the information on the object is generated and output by at least the one pair of imaging devices 30 imaging the object. The information on the object corresponds to images of a construction object imaged by at least the one pair of imaging devices 30. The detection processing device 51 obtains the shape information by applying the image processing by the stereo method to the images of the object, and outputs the same. In the present embodiment, a construction object of the excavator 1 having at least the one pair of imaging devices 30 is imaged by at least the one pair of imaging devices 30, but a construction object of a different work machine may also be imaged by at least the one pair of the imaging devices 30.

In the present embodiment, the object detected by an imaging device 30 represents an object of construction (hereinafter suitably referred to as a construction object) and a constructed object. In the present embodiment, the construction object and the constructed object are only required to be a construction object and an constructed object of at least one of the excavator 1 having the imaging device 30, a different excavator lot, a work machine other than the excavator, and a worker.

The detection processing device 51 has a calculation unit 51A and an information attaching unit 51B. The calculation unit 51A applies the image processing by the stereo system to one pair of images captured by at least the one pair of imaging devices 30 and acquires shape information. The information attaching unit 51B attaches various kinds of information to the shape information and outputs the same. The various kinds of information attached to the shape information include time information. The time information includes information on at least a time included in a period from a time when the object is detected by the calculation unit 51A and at least the one pair of imaging devices 30 to a time when the shape information is output. The time information is acquired from, for example, a timer inside the detection processing device 51. Besides the time information, the various kinds of information may further include at least one of information indicating positions where at least the one pair of imaging devices 30 images the object, and information to identify the excavator 1 having the imaging devices 30 that have imaged the object. Functions of each of the calculation unit 51A and the information attaching unit 51B are implemented by the processing unit PR illustrated in FIG. 4.

In the present embodiment, at least the one pair of imaging devices 30 is mounted on the excavator 1 and each imaging device corresponds to an object detecting unit to detect an object and output information on the object. The detection processing device 51 corresponds to a shape detecting unit to output shape information indicating a three-dimensional shape of an object by using the information on the object detected by at least the one pair of imaging devices 30. Instead of at least the one pair of imaging devices 30, a 3D scanner such as a laser scanner may also be used. Since the 3D scanner detects an object and outputs shape information indicating a three-dimensional shape of the object, the 3D scanner has functions of the above-described object detecting unit and shape detecting unit.

The detection processing device 51 has a hub 31 and an imaging switch 32 connected. The plurality of imaging devices 30a, 30b, 30c, 30d is connected the hub 31. The imaging devices 30a, 30b, 30c, 30d and the detection processing device 51 may be connected without using the hub 31. Results imaged by the imaging devices 30a, 30b, 30c, 30d are received in the detection processing device 51 via the hub 31. The detection processing device 51 acquires, via the hub 31, the results imaged by the imaging devices 30a, 30b, 30c, and 30d, in the present embodiment, images of the object. When the imaging switch 32 is operated, at least the one pair of the imaging devices 30 images the object in the present embodiment. The imaging switch 32 is installed inside the operator's compartment 4 illustrated in FIG. 2. For example, the imaging switch 32 is installed near the operating device 35, but an installation place of the imaging switch 32 is not limited thereto.

In a case of acquiring images of the object by at least the one pair of imaging devices 30, the control system 50 may start imaging at the same time of start swinging the swing body 3, may finish imaging by stopping swinging the same, and may obtain shape information by applying the image processing by the stereo method on the basis of images acquired during the swing. In this case, in the control system 50, the detection processing device 51 receives, for example, a signal or an electric signal indicating a change of a pilot pressure output in accordance with operation of an operating device to swing the swing body 3 out of the operating device 35, and determines timing to start swinging or stop swinging the swing body 3 to perform imaging.

When the excavator 1 constructs a construction object, the construction information generating device 52 obtains and outputs target construction information that is information on a target shape. In the present embodiment, the construction information generating device 52 obtains the target construction information by using the shape information of the construction object obtained by the detection processing device 51. In the present embodiment, the target construction information is positional information in which a targeted shape when the construction object is constructed is represented by a three-dimensional coordinate in a global coordinate system. The target construction information may also be information on a three-dimensional coordinate in a coordinate system other than the global coordinate system. In the present embodiment, the construction information generating device 52 corresponds to a construction information generating unit.

The information on the construction object acquired by at least one pair of imaging devices 30 is transmitted to the outside of the excavator 1 via the communication device 25, and for example, the management device 61 may obtain a coordinate of the object in the three-dimensional coordinate system. In this case, the management device 61 implements the function of the detection processing device 51. Additionally, the management device 61 may also implement the function of the construction information generating device 52. The shape information on the construction object obtained by the detection processing device 51 mounted on the excavator 1 is transmitted to the outside of the excavator 1 via the communication device 25, and for example, the management device 61 may obtain the target construction information. In this case, the management device 61 implements the function of the construction information generating device 52.

The sensor control device 53 has sensors connected in order to detect information on a state of the excavator 1 and information on a surrounding state of the excavator 1. The sensor control device 53 converts the information acquired from the sensors to a format that can be handled by other electronic devices and apparatuses, and outputs the converted information. The information on the state of the excavator 1 includes information on a posture of the excavator 1, information on a posture of the work unit 2, and the like. In the example illustrated in FIG. 3, the IMU 24, a first angle detecting unit 18A, a second angle detecting unit 18B, and a third angle detecting unit 18C are connected to the sensor control device 53 as sensors to detect the information on the state of the excavator 1, but the sensors are not limited thereto.

The IMU 24 detects and outputs an acceleration rate and an angular rate which act on itself, specifically, an acceleration rate and an angular rate which act on the excavator 1. The posture of the excavator 1 can be grasped from the acceleration rate and the angular rate which act on the excavator 1. As far as the posture of the excavator 1 can be detected, a device other than the IMU 24 may also be applied. In the present embodiment, the first angle detecting unit 18A, second angle detecting unit 18B, and third angle detecting unit 18C are, for example, stroke sensors. These sensors indirectly detect a rotation angle of the boom 6 relative to the vehicle body 1B, a rotation angle of the arm 7 relative to the boom 6, and a rotation angle of the bucket 8 relative to the arm 7 by respectively detecting stroke lengths of the boom cylinder 10, arm cylinder 11 and bucket cylinder 12. A position of a portion of the work unit 2 in the vehicle body coordinate system can be grasped from the rotation angle of the boom 6 relative to the vehicle body 1B, rotation angle of the arm 7 relative to the boom 6, and rotation angle of the bucket 8 relative to the arm 7 detected by the first angle detecting unit 18A, second angle detecting unit 18B, and third angle detecting unit 18C, and also is grasped from a dimension of the work unit 2. For example, the position of the portion of the work unit 2 is, for example, a position of the blade edge 8BT of the bucket 8. The first angle detecting unit 18A, second angle detecting unit 18B, and third angle detecting unit 18C may be potentiometers or inclinometers instead of the stroke sensors.

The engine control device 54 controls an internal combustion engine 27 that is a power generation device of the excavator 1. The internal combustion engine 27 is, for example, a diesel engine, but not limited thereto. Furthermore, the power generating device of the excavator 1 may be a hybrid system device combining the internal combustion engine 27 and a generator motor. The internal combustion engine 27 drives a hydraulic pump 28.

The pump control device 55 controls a flow rate of a hydraulic fluid discharged from the hydraulic pump 28. In the present embodiment, the pump control device 55 generates a control command signal in order to adjust the flow rate of the hydraulic fluid discharged from the hydraulic pump 28. The pump control device 55 changes the flow rate of the hydraulic fluid discharged from the hydraulic pump 28 by changing a swash plate angle of the hydraulic pump 28 by using the generated control signal. The hydraulic fluid discharged from the hydraulic pump 28 is supplied to a control valve 29. The control valve 29 supplies the hydraulic oil supplied from the hydraulic pump 28 to hydraulic apparatuses such as the boom cylinder 10, the arm cylinder 11, the bucket cylinder 12, and a hydraulic motor 5M, and drives these hydraulic apparatuses.

For example, the work unit control device 56 executes control to move the blade edge 8BT of the bucket 8 along a targeted construction surface. The work unit control device 56 corresponds to a work unit control unit. This control will be suitably referred to as work unit control in the following. In executing such work unit control, for example, the work unit control device 56 acquires target construction information generated by the construction information generating device 52, and controls the work unit 2 by controlling the control valve 29 such that the blade edge 8BT of the bucket 8 follows a target construction surface included in the target construction information. The excavator 1 may not include the work unit control device 56 and may be able to display, on the screen 58D of the display device 58, a positional relation between the own work unit 2 and target construction information, as a construction guidance image, obtained by a method described later.

For example, the construction management device 57 collects at least one of the shape information obtained by the detection processing device 51, the target construction information generated by the construction information generating device 52, shape information on a construction result obtained after the excavator 1 constructed a construction object, and shape information indicating a current topography of a construction object to be constructed from now by the excavator 1, and stores the collected information in a storage unit 57M. The construction management device 57 transmits the construction result stored in the storage unit 57M to the management device 61 or to the mobile terminal device 64 via the communication device 25. The construction management device 57 transmits the construction result stored in the storage unit 57M to the management device 61 or to the mobile terminal device 64 via the communication device 25. The construction management device 57 may collect at least one of the shape information and the target construction information obtained by the detection processing device 51, and transmit the collected information to the management device 61 or the mobile terminal device 64 without storing the same in the storage unit 57M. The storage unit 57M corresponds to the storage unit MR illustrated in FIG. 4.

The construction management device 57 may be provided in, for example, the management device 61 provided outside the excavator 1. In this case, the construction management device 57 acquires shape information or a construction result from the excavator 1 via the communication device 25.

A construction result is, for example, shape information obtained by at least one pair of imaging devices 30 imaging a constructed construction object and then the detection processing device 51 applying the image processing by the stereo method to the imaged results. In the following, the shape information indicating the current topography of the construction object to be constructed will be suitably referred to as current topography information. Additionally, the shape information may be shape information indicating a construction result or may be shape information indicating a current topography. The current topography information is, for example, shape information obtained by the detection processing device 51 after at least one pair of the imaging devices 30 images a construction object to be constructed by the excavator 1, a different work machine 70, a worker, or the like.

For example, the construction management device 57 collects construction results after completion of daily work and transmits the same to at least one of the management device 61 and the mobile terminal device 64, or collects construction results from daily work a plurality of times and transmits the same to at least one of the management device 61 and the mobile terminal device 64. The construction management device 57 may transmit pre-construction shape information to the management device 61 or the mobile terminal device 64, for example, before work in the morning.

In the present embodiment, the construction management device 57 collects, for example, two construction results at noon and at the end of work from the daily work, and transmits the results to the management device 61 or the mobile terminal device 64. The construction result may be a construction result obtained by imaging a range where construction has been performed out of an entire construction site or may be a construction result obtained by imaging the entire construction site. Since the construction result to be transmitted to the management device 61 or the mobile terminal device 64 is obtained from the range where construction has been performed, an imaging time, an image processing time, and a transmitting time of construction results can be suppressed from being increased, and this is preferable.

The display device 58 displays, on the screen 58D like a liquid crystal display panel, information on the excavator 1, displays a construction guidance image on the screen 58D, and additionally obtains a position of the work unit 2 in a case where the above-described work unit control is executed in the present embodiment. A position of the blade edge 8BT to be obtained by the display device 58 is a position of the blade edge 8BT of the bucket 8 in the present embodiment. The display device 58 acquires current positions of the antennas 21, 22 detected by the position detecting device 23, rotation angles detected by the first angle detecting unit 18A, second angle detecting unit 18B, and third angle detecting unit 18C, the dimension of the work unit 2 stored in the storage unit MR, and output data of the IMU 24, and obtains the position of the blade edge 8BT of the bucket 8 by using the obtained information. In the present embodiment, the display device 58 obtains the position of the blade edge 8BT of the bucket 8, but the position of the blade edge 8BT of the bucket 8 may also be obtained by a device other than the display device 58.

The communication device 25 is a communication unit in the present embodiment. The communication device 25 communicates with at least one of the management device 61 of the management facility 60, the different work machine 70, and the mobile terminal device 64 via a communication line NTW to mutually exchange information. Among the information exchanged by the communication device 25, the information to be transmitted from the control system 50 to at least one of the management device 61, the different work machine 70, and the mobile terminal device 64 includes information on construction. The information on construction includes at least one of the above-described shape information and information obtained from the shape information. The information obtained from the shape information includes, for example, information obtained by processing the above-described target construction information and shape information, but is not limited thereto. The information on construction may be transmitted by the communication device 25 after being stored in the storage unit of the detection processing device 51, the storage unit of the construction information generating device 52, and the storage unit 57M of the construction management device 57, or may be transmitted without being stored.

In the present embodiment, the communication device 25 performs communication by radio communication. Therefore, the communication device 25 has an antenna 25A for radio communication. The mobile terminal device 64 is, for example, carried by a manager who manages work of the excavator 1, but is not limited thereto. The different work machine 70 has a function to communicate with at least one of the excavator 1 having the control system 50, and the management device 61. The different work machine 70 may be an excavator 1 having a control system 50, an excavator not having the control system 50, or a work machine other than an excavator. The communication device 25 may communicate with at least one of the management device 61 of the management facility 60, different work machine 70, and mobile terminal device 64 via wired communication so as to mutually exchange information.

The construction management system 100 includes the management device 61 of the management facility 60, the control system 50, and excavator 1 having the control system 50. The construction management system 100 may further include the mobile terminal device 64. The number of excavators 1 included in the construction management system 100 and having the control system 50 may be one or plural. The management facility 60 includes the management device 61 and a communication device 62. The management device 61 communicates with at least the excavator 1 via the communication device 62 and the communication line NTW. The management device 61 may communicate with the mobile terminal device 64 and also may communicate with the different work machine 70. A radio communication apparatus may be mounted such that the excavator 1 can directly perform vehicle-to-vehicle radio communication with at least one of the different excavator lot and a work machine. Additionally, at least one of the excavator 1, different excavator lot, and work machine may be each mounted with an apparatus or an electronic device so as to be able to execute processing executed by the management device 61 of the management facility 60 or the like.

The management device 61 receives at least one of a construction result and current topography information from the excavator 1 and manages progress of construction. The management device 61 may receive shape information from the excavator 1, generate target construction information using this shape information, and transmit the generated target construction information to the excavator 1. The management device 61 may generate target construction information from design information of a construction object and transmit the generated target construction information to the excavator 1. The management device 61 may process the construction result received from the excavator 1 and display, on a display device 67, progress information on the construction as a moving picture, or may transmit information of the moving picture to the excavator 1 or the mobile terminal device 64 and display the information on the display device 58 of the excavator 1 or on a screen of the mobile terminal device 64. As described above, generation of the target construction information executed by the management device 61 may also be executed by at least one of the excavator 1 and the different work machine 70.

<Construction of Construction Object>

In the first embodiment, the control system 50 obtains shape information, which is information indicating a shape of a construction object, by imaging the construction object by using at least two of the plurality of imaging devices 30 illustrated in FIG. 2. Then, the control system 50 obtains target construction information by using the obtained shape information. In a case where the excavator 1 constructs the construction object, the control system 50 controls the work unit 2 so as to follow the obtained target construction information.

Figure 5:
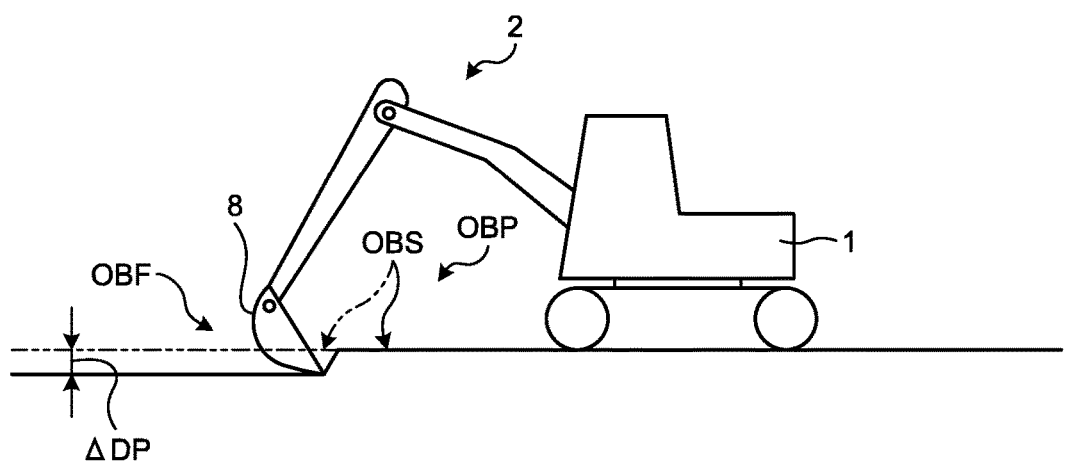
FIG. 5 is a view illustrating an exemplary construction site where the excavator according to the first embodiment performs construction.

FIG. 5 is a view illustrating an exemplary construction site where the excavator 1 according to the first embodiment performs construction. In the first embodiment, a construction object OBP of the excavator 1 is the ground. In the present embodiment, the construction object OBP is at least a part of the construction site. In the present embodiment, as illustrated in FIG. 5, construction performed by the excavator 1 for the construction object OBP is work to excavate surface soil by a predetermined depth ΔDP from a surface OBS of the construction object OBP. A portion where construction has been executed out of the construction object OBP is a construction executed portion OBF. Depending on a construction plan, the construction executed portion OBF may indicate a portion where construction is not needed. The construction executed portion OBF is at least a part of the construction object OBP. Next, shape information obtained by the control system 50 will be described.

<Object Imaging and Generation of Shape Information>

Figure 6:
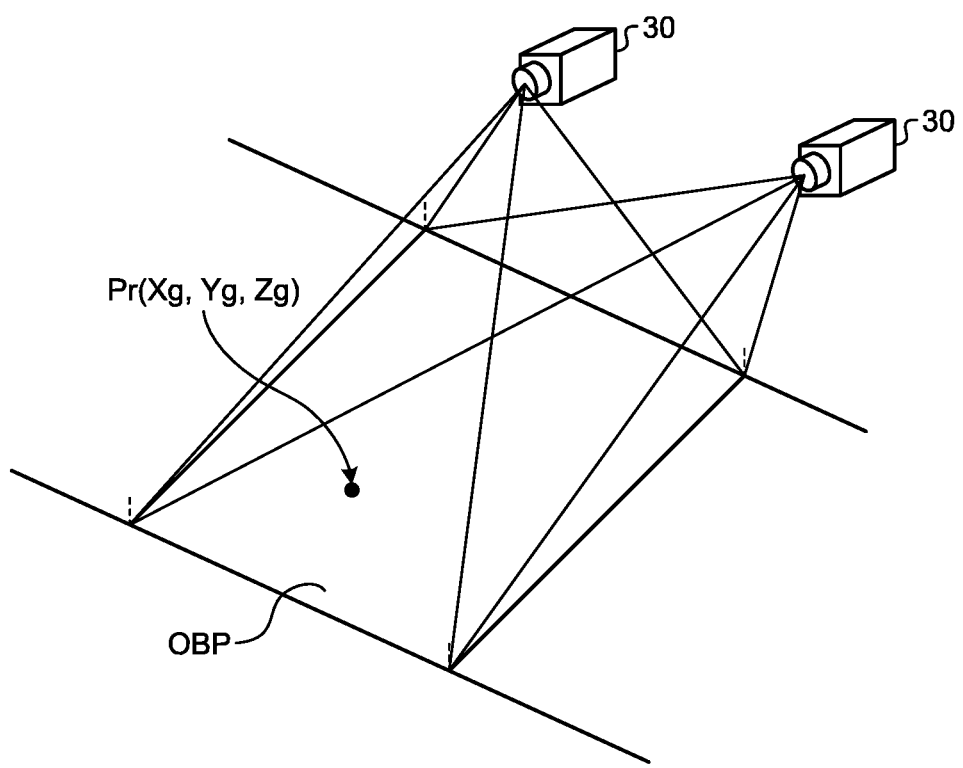
FIG. 6 is a view to describe shape information obtained by the control system of the work machine according to the first embodiment.

FIG. 6 is a view to describe shape information obtained by the control system of the work machine according to the first embodiment. In this case, as for the shape information, a construction object OBP corresponding to a portion to be constructed by the excavator 1 from now exists in front of the excavator 1. The shape information is obtained from the construction object OBP. In a case of generating the shape information from the construction object OBP, the control system 50 causes at least one pair of the imaging devices 30 to image the construction object OBP. In the present embodiment, when an operator of the excavator 1 operates the imaging switch 32 illustrated in FIG. 3 to input an imaging command to the detection processing device 51, the detection processing device 51 causes at least the one pair of imaging devices 30 to image the construction object OBP.

The detection processing device 51 of the control system 50 applies the image processing by the stereo method to images of the construction object OBP imaged by at least the one pair of imaging devices 30 to obtain positional information on the construction object OBP, in the present embodiment, three-dimensional positional information. Since the positional information on the construction object OBP obtained by the detection processing device 51 is information in the coordinate system of the imaging device 30, the obtained positional information is converted to positional information in the global coordinate system. The positional information on the construction object in the global coordinate system is shape information. In the present embodiment, the shape information is information including at least one position Pr (Xg, Yg, Zg) on the surface OBS of the construction object OBP in the global coordinate system. The position Pr (Xg, Yg, Zg) is a coordinate in the global coordinate system and also is three-dimensional positional information.

Figure 7:
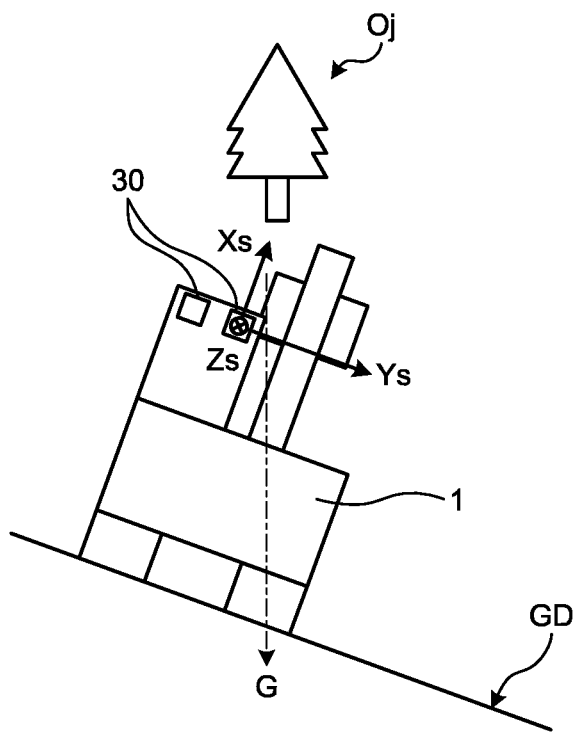
FIG. 7 is a view illustrating a state in which the excavator is inclined in an acting direction of gravity.
Figure 8:
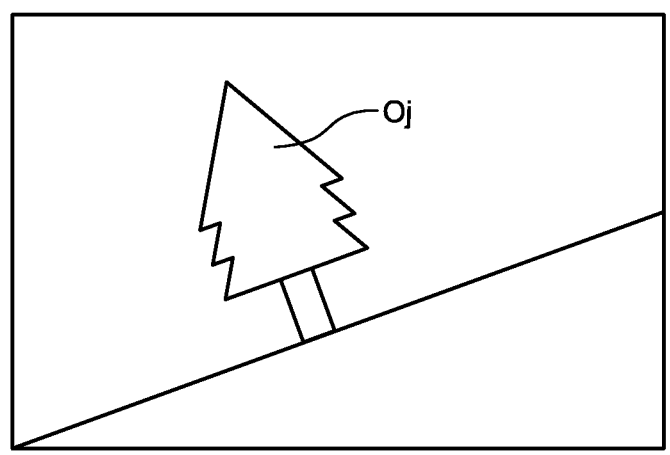
FIG. 8 is a view illustrating an exemplary image captured in a state where the excavator is inclined in the acting direction of gravity.

FIG. 7 is a view illustrating a state in which the excavator 1 is inclined in an acting direction G of gravity. FIG. 8 is a view illustrating an exemplary image in which an object Oj is imaged by at least one pair of imaging devices 30 in the state where the excavator 1 is inclined in the acting direction G of the gravity. When at least the one pair of imaging devices 30 images the object Oj in a state where the excavator 1 is installed on an inclined surface GD, an imaging device coordinate system (xs, ys, zs) is inclined to the acting direction G of the gravity. Since the object Oj is inclined as illustrated in FIG. 8 in the image obtained in this state, when shape information is obtained by applying the image processing by the stereo method to this image, the shape information may be influenced by this inclination. The control system 50 detects a posture of the excavator 1 by the IMU 24 and obtains shape information by using the information on the detected posture of the excavator 1.

Figure 9:
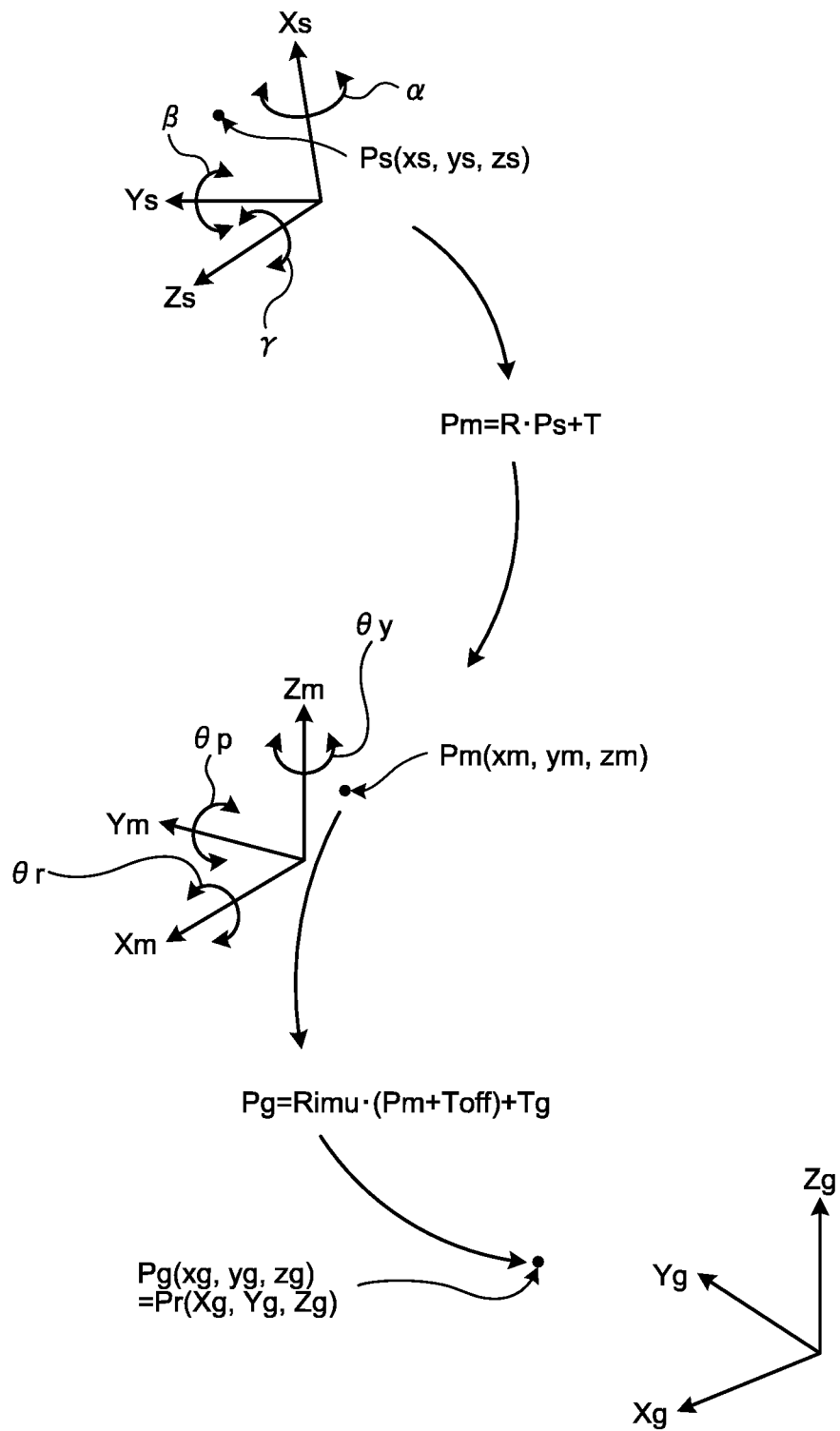
FIG. 9 is a diagram to describe exemplary processing for the control system according to the first embodiment to obtain shape information.
Figure 10:
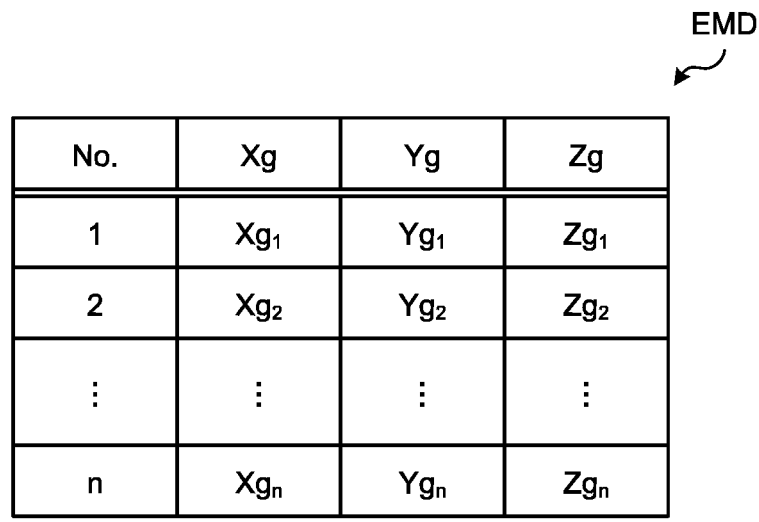
FIG. 10 is a diagram illustrating an exemplary data file of the shape information obtained by the control system according to the first embodiment.

FIG. 9 is a diagram to describe exemplary processing for the control system 50 according to the first embodiment to obtain shape information. FIG. 10 is a diagram illustrating an exemplary data file of the shape information obtained by the control system 50 according to the first embodiment. A position Ps (xs, ys, zs) of the construction object OBP obtained from the images captured by at least the one pair of imaging devices 30 is a coordinate of the imaging device coordinate system (xs, ys, zs). Since the shape information is to be a coordinate in the global coordinate system (Xg, Yg, Zg), the detection processing device 51 converts the position Ps (xs, ys, zs) to a position Pg (xs, ys, zs) of the global coordinate system (Xg, Yg, Zg). The position Pg (xs, ys, zs) is the position Pr (Xg, Yg, Zg) on the surface OBS of the construction object OBP, namely, the shape information.

The position Ps (xs, ys, zs) is converted from the position in the imaging device coordinate system (xs, ys, zs) to a position Pm (xm, ym, zm) of the vehicle body coordinate system (Xm, Ym, Zm) by Formula (1). The position Pm (xm, ym, zm) of the vehicle body coordinate system (Xm, Ym, Zm) is converted to the position Pg (xs, ys, zs) of the global coordinate system (Xg, Yg, Zg) by Formula (2).

$$Pm = R \cdot Ps + T \tag{1}$$

$$Pg = Rimu \cdot (Pm + Toff) + Tg \tag{2}$$

$$R = \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix} \tag{3}$$

$$T = \begin{pmatrix} x_0 \\ y_0 \\ z_0 \end{pmatrix} \tag{4}$$

$$Rimu = \tag{5}$$
$$\begin{pmatrix} \cos\theta d & -\sin\theta d & 0 \\ \sin\theta d & \cos\theta d & 0 \\ 0 & 0 & 1 \end{pmatrix} \begin{pmatrix} \cos\theta p & 0 & \sin\theta p \\ 0 & 1 & 0 \\ -\sin\theta p & 0 & \cos\theta p \end{pmatrix} \begin{pmatrix} 1 & 0 & 0 \\ 0 & \cos\theta r & -\sin\theta r \\ 0 & \sin\theta r & \cos\theta r \end{pmatrix}$$

$$Toff = \begin{pmatrix} x_1 \\ y_1 \\ z_1 \end{pmatrix} \tag{6}$$

$$Tg = \begin{pmatrix} x_2 \\ y_2 \\ z_2 \end{pmatrix} \tag{7}$$

R in Formula (1) represents a rotation matrix expressed by Formula (3), and T represents a translation vector expressed by a matrix of Formula (4) Rimu in Formula (2) represents a rotation matrix expressed by Formula (5), and Toff represents a translation vector expressed by a matrix of Formula (6). Toff represents an offset value of a distance from an origin of the vehicle body coordinate system to any one of the antennas 21, 22. Tg represents a translation vector of any one of the antennas 21, 22, which is expressed by a matrix of the Formula (7). An angle α, an angle β, and an angle γ in the rotation matrix R represent an inclination of the imaging device coordinate system with respect to the vehicle body coordinate system. The angle α, angle β, and angle γ are preliminarily obtained, for example, after the plurality of imaging devices 30 is mounted on the excavator 1, and then stored in the storage unit of the detection processing device 51. $x_0$, $y_0$, $z_0$ of the matrix T represent a distance between an origin of the imaging device coordinate system and the origin of the vehicle body coordinate system. For example, $x_0$, $y_0$, $z_0$ are measured after the plurality of imaging devices 30 is mounted on the excavator 1 or are preliminarily obtained from design information on the excavator 1, and then stored in the storage unit of the detection processing device 51.

An angle θr, an angle θp, and an angle θd in a rotation matrix Rimu correspond to a roll angle, a pitch angle, and an azimuth angle of the excavator 1, respectively. The roll angle θr, pitch angle θp, and azimuth angle θd represent a posture of the excavator 1. The roll angle θr and the pitch angle θp are obtained by the IMU 24 illustrated in FIG. 3 or obtained by the detection processing device 51 from a detection value of the IMU 24. The azimuth angle θd is obtained by a GPS compass formed of the antennas 21, 22 and the position detecting device 23 illustrated in FIG. 3. More specifically, the azimuth angle θd is obtained by the position detecting device 23 on the basis of relative positions of the two antennas 21, 22. The roll angle θr, pitch angle θp, and azimuth angle θd are changed by a change of the posture of the excavator 1. In the present embodiment, a yaw angle θy obtained by the IMU 24 may be used instead of the azimuth angle (azimuth data) obtained by the GPS compass. In the present embodiment, the roll angle θr, pitch angle θp, and azimuth angle θd are values detected by the IMU 24 and the position detecting device 23 when at least one pair of imaging devices 30 detects an object such as a construction object in a construction site, a constructed construction site, and the like. The roll angle θr, pitch angle θp, yaw θy, or azimuth angle θd may also be obtained by a device other than the IMU 24 or by a device other than the position detecting device 23, for example, a gyroscope or the like.

$x_1$, $y_1$, $z_1$ of the matrix Toff represent a distance from the origin of the vehicle body coordinate system to the installation positions of the antennas 21, 22 illustrated in FIGS. 1 and 3. For example, $x_1$, $y_1$, $z_1$ are measured after the antennas 21, 22 are mounted on the excavator 1, or preliminarily obtained from the design information on the excavator 1, and then stored in the storage unit of the detection processing device 51.

$x_2$, $y_2$, $z_2$ of the matrix Tg represent positions of the antennas 21, 22 illustrated in FIGS. 1 and 3 and the positions of the antennas 21, 22 in the global coordinate system detected by the position detecting device 23. $x_1$, $y_1$, $z_1$ are changed by a change of the position of the excavator 1, more specifically, a change of the positions of the antennas 21, 22.

The detection processing device 51 converts the position Ps (xs, ys, zs) of the construction object OBP obtained from the images captured by at least the one pair of imaging devices 30 to the position Pg (xg, yg, zg) in the global coordinate system by using Formulas (1) to (7). At this point, the detection processing device 51 acquires the roll angle θr and the pitch angle θp from the IMU 24, acquires the positions of the antennas 21, 22 in the global coordinate system and the azimuth angle θd from the position detecting device 23, and uses the acquired information in the above-described conversion. As described above, the detection processing device 51 may also use the yaw angle θy detected by the IMU 24 instead of the azimuth angle θd. The detection processing device 51 sets the converted position Pg (xg, yg, zg) as the position Pr (Xg, Yg, Zg) on the surface OBS of the construction object OBP, namely, the shape information. In the present embodiment, the position Pr on the surface OBS of the construction object OBP is specified as an example of the shape information, but the shape information is not limited thereto. For example, the shape information may be a position on the surface of the construction object OBP after construction or a position on the surface of the construction object OBP in the middle of construction.

The detection processing device 51 obtains and outputs the position Pr (Xg, Yg, Zg) on the surface OBS of the construction object OBP for all over an entire region of the construction object OBP imaged by at least the one pair of imaging devices 30. In the present embodiment, the detection processing device 51 generates a data file EMD of the obtained position Pr (Xg, Yg, Zg) per predetermined unit as illustrated in FIG. 10. The data file EMD illustrated in FIG. 10 is a set including n pieces (n is an integer of 1 or more) of the positions Pr (Xg, Yg, Zg). The data file EMD also corresponds to the shape information in the present embodiment.

As the predetermined unit, for example, a range of the construction object OBP obtained by one-time imaging and a predetermined range of the construction object OBP can be exemplified. The predetermined range of the construction object OBP may be a part of the range obtained by one-time imaging or may be a range beyond the range obtained by one-time imaging. In the latter case, the range obtained by a plurality of times of imaging becomes an object.

In the present embodiment, when the detection processing device 51 generates a data file EMD, the data file EMD is stored in the own storage unit. Then, the detection processing device 51 generates target construction information by using the positions Pr of the data file EMD. Additionally, the construction management device 57 may also transmit the data file EMD generated by the detection processing device 51 from the communication device 25 to at least one of the management device 61, mobile terminal device 64, and different work machine 70 illustrated in FIG. 3.

Figure 11:
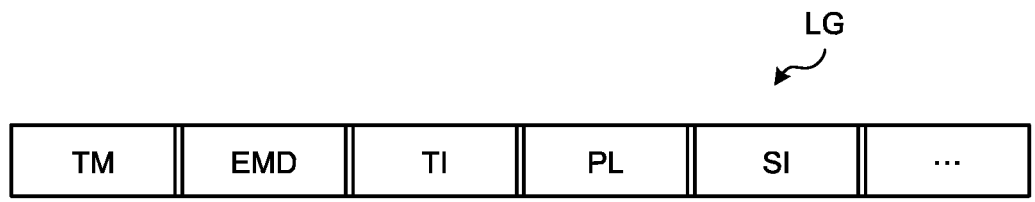
FIG. 11 is a diagram illustrating exemplary information including a data file transmitted by a construction management device.

FIG. 11 is a diagram illustrating exemplary information including a data file EMD transmitted by the construction management device 57. In the present embodiment, the information attaching unit 51B of the detection processing device 51 illustrated in FIG. 3 attaches, to shape information, time information TM in order to specify the shape information and outputs the shape information. The time information TM is information to specify the shape information on the basis of a time. In the present embodiment, as illustrated in FIG. 11, the information attaching unit 51B generates and outputs work information LG including the time information TM and the data file EMD that is the shape information. The time information TM may be, for example, a time when at least one pair of imaging devices 30 images a construction object OBP, a time when the calculation unit 51A generates the shape information, a time when the information attaching unit 51B outputs the work information LG, or a time when external devices of the excavator 1, such as the management device 61 and the mobile terminal device 64, acquire shape information. Specifically, the time information TM is at least one piece of time information existing during a period from a time when a construction object OBP before, during, or after construction is detected by at least the one pair of the imaging device 30 and the detection processing device 51 to a time when the external device of the excavator 1 acquires shape information. In a case where the time information TM is information at the time when the external device of the excavator 1 acquires the shape information, the information attaching unit 51B is provided in the external device of the excavator 1, and the information attaching unit 51B attaches, to the shape information, the time information TM indicating the time when the external device acquires the shape information.

In the present embodiment, the work information LG includes target construction information TI, an imaging position PL, and posture information SI of the excavator 1 in addition to the time information TM and the data file EMD. The target construction information TI is generated from the shape information included in the work information LG, namely, information of the data file EMD. The imaging position PL is information indicating places where at least one pair of imaging devices 30 images a construction object OBP before, during, or after construction. The imaging position PL is obtained on the basis of positions of the antennas 21 and 22 in the global coordinates detected by the position detecting device 23 illustrated in FIG. 3. The posture information SI is information indicating a posture of the excavator 1, in the present embodiment, indicating a roll angle θr, a pitch angle θp, and a yaw angle θy. The roll angle θr, yaw angle θy, and yaw angle θy are detection values of the IMU 24, but an azimuth angle θd detected by the position detecting device 23 may also be used instead of the yaw angle θy. The work information LG may also include an identification number in addition to the above. The identification number is information to indicate positions of at least one pair of imaging devices 30 and identify the excavator 1 having at least the one pair of imaging devices 30 having imaged an object. The identification number may also be, for example, an IP address of the communication device 25. Also, manufacturing numbers of at least the one pair of the imaging devices and a vehicle body number of the excavator 1 are used as the identification number, but not limited thereto.

The information included in the work information LG is not limited to the information described above. For example, the work information LG may also include an operator ID in order to identify an operator of the excavator 1. As for the work information LG, the information attaching unit 51B of the detection processing device 51 may not necessarily generate all of the information. In the present embodiment, the information attaching unit 51B may generate and output the work information LG including at least the time information TM and the data file EMD. Information other than the time information TM and the data file EMD is attached by, for example, the construction management device 57. In this case, the construction management device 57 acquires the target construction information TI generated by the construction information generating device 52, and attaches the acquired information to the work information LG acquired from the information attaching unit 51B. Additionally, the construction management device 57 acquires the identification number and the imaging position PL via the signal line 59 and attaches the acquired information to the work information LG. The construction management device 57 transmits the work information LG to at least one of the management device 61 and the mobile terminal device 64 at predetermined timing, in the present embodiment, twice a day.

In the present embodiment, when at least one pair of imaging devices 30 images an object, the detection processing device 51 generates and outputs the work information LG including at least the time information TM and the data file EMD, and transmits the work information LG to the outside of the excavator 1 via the communication device 25. The work information LG transmitted to the outside of the excavator 1 is acquired by the management device 61 and also acquired by the mobile terminal device 64.

In the present embodiment, when the imaging switch 32 illustrated in FIG. 3 is operated, at least one pair of the imaging devices 30 images an object. The calculation unit 51A of the detection processing device 51 applies the image processing by the stereo method to images captured by the imaging devices 30 to generate shape information. The information attaching unit 51B of the detection processing device 51 outputs the work information LG in which the time information is attached to the shape information. The work information LG is transmitted to at least one of the management device 61 and the mobile terminal device 64 via the construction management device 57 and the communication device 25 or via the communication device 25.

The detection processing device 51 causes at least the one pair of imaging devices 30 to image the object at a predetermined time interval, for example, every 10 minutes in order to monitor the surroundings of the excavator 1. Two-dimensional images captured by at least the one pair of imaging devices 30 are stored in the storage unit of the detection processing device 51, and when a certain amount of information is accumulated, the accumulated information is transmitted to the management device 61 via the communication device 25. The above-described two-dimensional images may be transmitted at timing when the work information LG is transmitted to the management device 61, or may also be promptly transmitted to the management device 61 immediately after being imaged.

Figure 12:
FIG. 12 is a diagram illustrating an example in which a data file is stored in a storage unit of the management device.

In the present embodiment, the detection processing device 51 permits three-dimensional measurement using the imaging devices 30 under following conditions (conditions for permission) that: the detection processing device 51 recognizes that, for example, a plurality of imaging devices 30 is activated; the signal line 59 is not disconnected; output of the IMU 24 is stable; and positioning by the GNSS is FIX (normal). In a case where any one of the conditions for permission is not satisfied, the detection processing device 51 does not permit three-dimensional measurement using the imaging devices 30 even though the imaging switch 32 is operated. The above condition in which output of the IMU 24 is stable means that the excavator 1 is in a stationary state. Measurement accuracy of the object is suppressed from being degraded by providing the above-described conditions for the three-dimensional measurement by the imaging devices 30. The conditions for permission are examples for the control system 50 to permit three-dimensional measurement. The control system 50 may use any one of the conditions for permission or may not use any of the conditions for permission FIG. 12 is a diagram illustrating an example in which a data file EMD is stored in the storage unit of the management device 61. The work information LG transmitted from the excavator 1 is stored in the storage unit of the management device 61. In a case where the work information LG is transmitted to the mobile terminal device 64, the work information LG may be stored in a storage unit of the mobile terminal device 64.

For example, each piece of time information TM and each data file EMD are stored in a correlated manner inside the storage unit of the management device 61 as illustrated in a data table TB of FIG. 12. The data table TB is updated every time the management device 61 acquires a new piece of time information TM and a data file EMD. A piece of information having the same number attached to a data file EMD represents shape information on a same place of a work site. The management device 61 can generate information indicating a current state of a construction site (hereinafter suitably referred to as current state information) by using a data file EMD included in the data table TB. In this case, in a case where there are data files EMD to which the same number attached, the current state information is generated by using a latest data file EMD. Whether a data file EMD is the latest one or not is determined by a piece of time information TM correlated to the data file EMD. For example, in a case where two data files EMD1 exist, the management device 61 compares pieces of the time information TM correlated to the respective data files EMD1, and generates current state information by using a newer data file EMD1. Thus, the management device 61 can generate the latest current state information.

The management device 61 outputs information on a current topography of the entire construction site of the excavator 1, namely, current state information, by using the shape information to which the time information TM is attached, specifically, by using the data file EMD. For example, the management device 61 generates and outputs the current state information on the entire construction site of the excavator 1 by collecting and combining, for all over the entire construction site, respective data files EMD to which a latest piece of time information TM are attached. The current state information on the entire construction site is displayed on the display device 67 of the management facility 60 and also displayed on the mobile terminal device 64, for example.

The current state information on the entire construction site may be generated by using a construction result by the excavator 1, and also may be generated by using a construction result by the different work machine 70. Additionally, the current state information on the entire construction site may also be generated by using a construction result of using neither the excavator 1 nor the different work machine 70, for example, a result of construction executed by a worker with a shovel or the like. In the present embodiment, the current state information on the entire construction site may be generated by using at least one of the construction result by the excavator 1, the construction result by the different work machine 70, and the construction result of using neither the excavator 1 nor the different work machine 70, for example. At least one of the construction management device 57 of the excavator and the mobile terminal device 64 may generate and output the current state information on the entire construction site.

Figure 13:
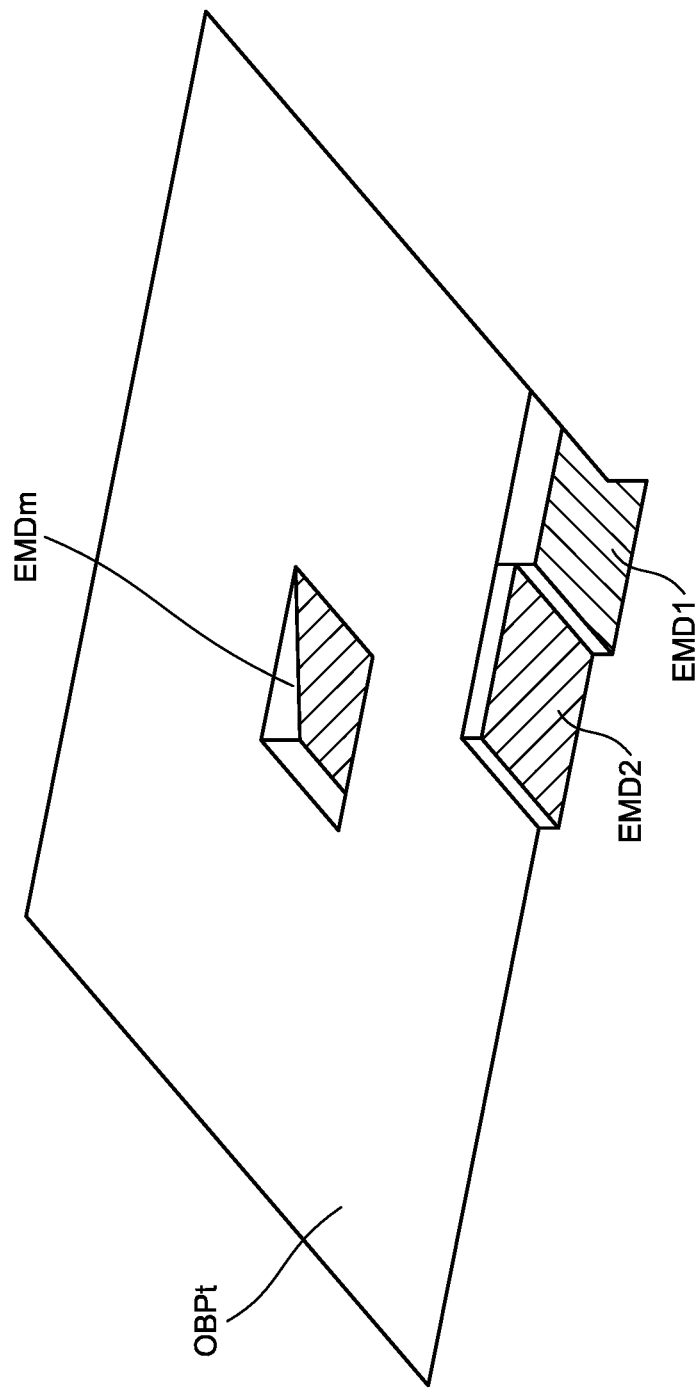
FIG. 13 is a view illustrating a relation between a construction object of an entire construction site and a range corresponding to a data file EMD.

FIG. 13 is a view illustrating a relation between a construction object OBPt of the entire construction site and a range corresponding to a data file EMD. FIG. 13 illustrates an example in which the ranges corresponding to latest data files EMD1, EMD2, . . . , EMDm are displayed inside the construction object OBPt of the entire construction site. The ranges corresponding to the data files EMD1, EMD2, . . . , EMDm are ranges specified by pieces of three-dimensional positional information included in the data files EMD1, EMD2, EMDm.

For example, the management device 61 generates information in which the ranges corresponding to the data files EMD1, EMD2, EMDm are superimposed on the construction object OBPt of the entire construction site. Then, the management device 61 displays the generated information on, for example, the display device 67 inside the management facility 60. As a result, since the latest data files EMD1, EMD2, . . . , EMDm are displayed inside the construction object OBPt, a current state of the construction site is indicated. The management device 61 can acquire the current state of the construction site by combining the data files EMD having pieces of time information TM which are same or can be deemed same. The fact that the time information TM can be deemed same means that data files EMD correlated to the pieces of the time information TM falling within a predetermined time range are deemed to have been obtained at the same time. For example, in the case where the predetermined time range is set to a range from 9 o'clock in the morning to 17 o'clock in the evening, the data files EMD having pieces of the time information TM falling within this time range on a certain day of the week are deemed to have been obtained at the same time, and in a case where the day of the week is different, data files are deemed to have been obtained at different times.

Figure 14:
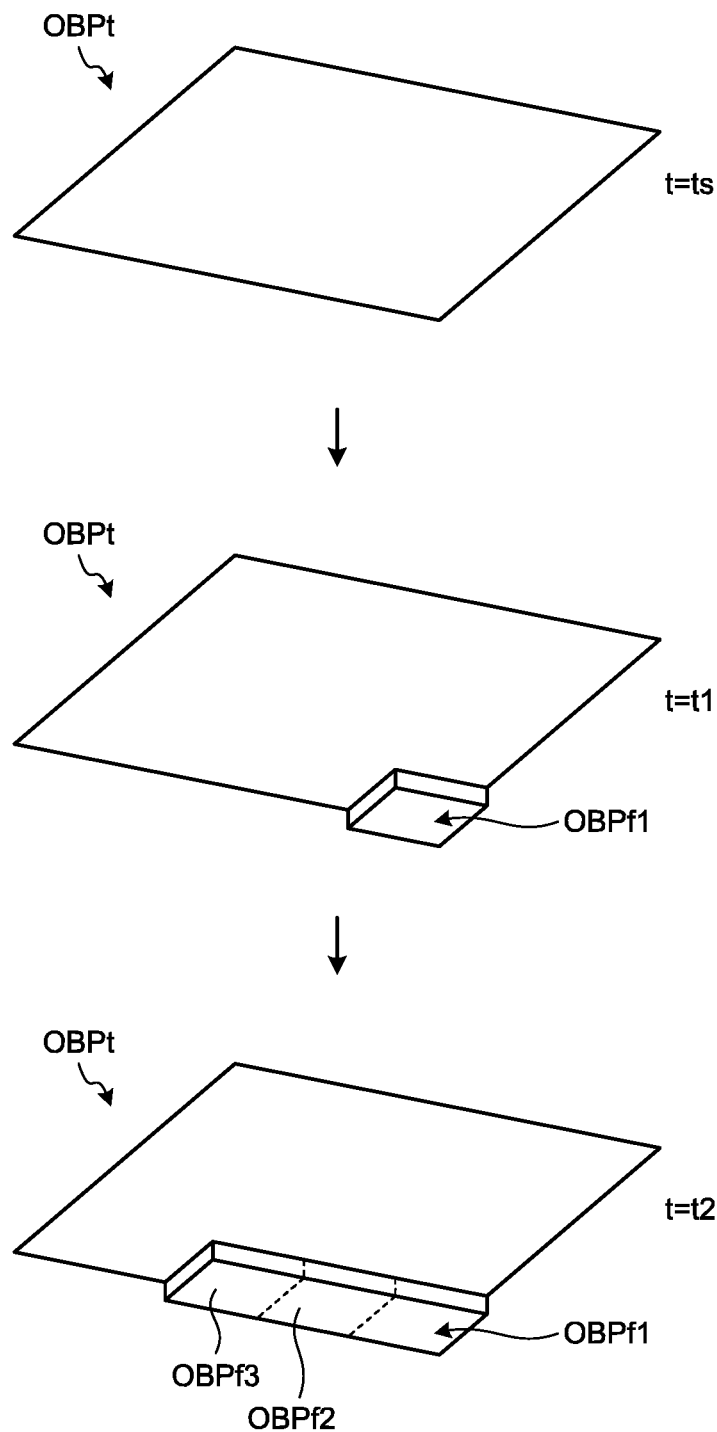
FIG. 14 is a view in which changes of the construction object of the entire construction site are arranged in time series.

FIG. 14 is a view in which changes of the construction object OBPt of the entire construction site are arranged in time series. A time t=ts indicates a state of the construction site before starting construction. At a time t=t1, a region OBPf1 of the construction object OBPt is constructed. Since the region OBPf1 is specified by shape information at the time t=t1, namely, three-dimensional information included in the data file EMD, a state of the entire construction site at the time t=t1 can be grasped by superimposing the region OBPf1 on the construction object OBPt before construction.

At a time t=t2, a region OBPf2 and a region OBPf3 of the construction object OBPt are further constructed in addition to the region OBPf1. Since the region OBPf2 and the region OBPf3 are specified by shape information at the time t=t2, namely, three-dimensional information included in the data file EMD, the state of the entire construction site at the time t=t2 can be grasped by superimposing the region OBPf2 and the region OBPf3 on the construction object OBP before construction. Since the region OBPf1 has been already constructed at the time t=t2, shape information corresponding to the region OBPf1, namely, a data file EMD corresponding to the region OBPf1 may not be necessarily obtained at the time t=t2. In a case where the data file EMD corresponding to the region OBPf1 is not obtained, the information at the time t=t1 becomes the latest for the region OBPf1.

At the time t=t2, the region OBPf1 at the time t=t1 is superimposed on the construction object OBPt before construction together with the region OBPf2 and the region OBPf3. In a case where the shape information corresponding to the region OBPf1, namely, the data file EMD corresponding to the region OBPf1 is obtained at the time t=t2, the region OBPf1 based on the latest data file EMD is superimposed on the construction object OBPt before construction together with the region OBPf2 and the region OBPf3.

The management device 61 generates, in order of the times t=ts, t1, t2, pieces of current state information on the entire construction object OBPt, and causes the display device 67 inside the management facility 60 to display the generated pieces of current state information in form of the three-dimensional images. In this case, the management device 61 can display the pieces of current state information by frame-by-frame playback for the respective times. With such display, a manager can easily grasp daily progress of construction. The mobile terminal device 64 may access the management device 61 via the communication line NTW to acquire the pieces of current state information and display the same on the screen. With such display, a worker of the construction site not present in the management facility 60 can easily grasp the daily progress of construction.

Figure 15:
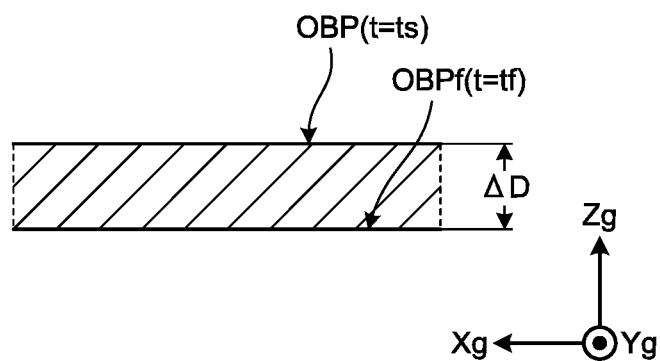
FIG. 15 is a view illustrating an example in which a removed soil amount or a banked soil amount is obtained from a difference between pieces of shape information obtained at different times.
Figure 16:
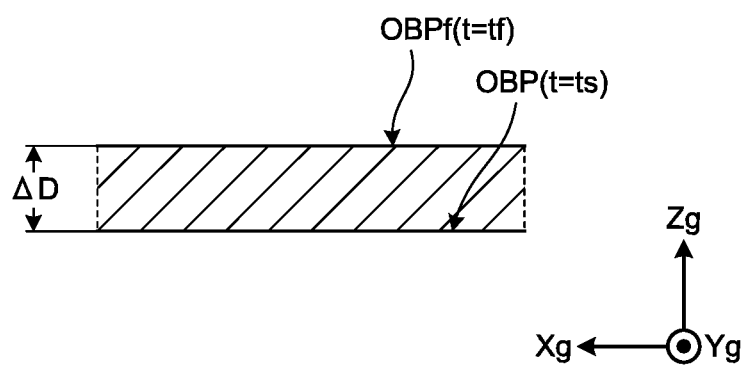
FIG. 16 is a view illustrating an example in which a removed soil amount or a banked soil amount is obtained from the difference between pieces of shape information obtained at different times.

FIGS. 15 and 16 are views illustrating examples in which a removed soil amount or a banked soil amount is obtained from a difference between pieces of shape information obtained at different times. In the present embodiment, the removed soil amount or the banked soil amount is determined on the basis of the pieces of shape information obtained at the different times. Assume that a construction object OBP at a time t=ts before construction is constructed and becomes a constructed object OBPf. In the global coordinate system (Xg, Yg, Zg), a difference between a Zg coordinate of shape information obtained after construction at the time t=tf and a Zg coordinate of shape information obtained before construction at the time t=ts is ΔD. A case where the difference ΔD is negative indicates a case where the soil is removed, and a case where the difference ΔD is positive indicates a case where the soil is banked. The removed soil amount or the banked soil amount (in the present embodiment, the soil amount is a volume) in the construction object OBP can be obtained by multiplying the difference ΔD by a dimension in an Xg direction and a dimension in a Yg axis direction of a constructed range. In the present embodiment, a removed soil amount or a banked soil amount not only by the excavator 1 but also by the different work machine 70 may also be obtained on the basis of pieces of shape information obtained at different times.

Thus, various kinds of information related to construction of the construction site can be obtained by correlating a data file EMD, namely, shape information to time information TM. Processing of generating current state information by using the data file EMD and the time information TM and obtaining the banked soil amount or the removed soil amount may be executed by any one of the management device 61, mobile terminal device 64, and construction management device 57 of the excavator 1. Also, any one of the management device 61, mobile terminal device 64, or construction management device 57 of the excavator 1 may execute the above-described processing and transmit a result to another apparatus via the communication line NTW. The above-described processing result may be applied to not only communication but also may be stored in a storage device and then passed to another apparatus. Next, the target construction information will be described.

<Target Construction Information>

Figure 17:
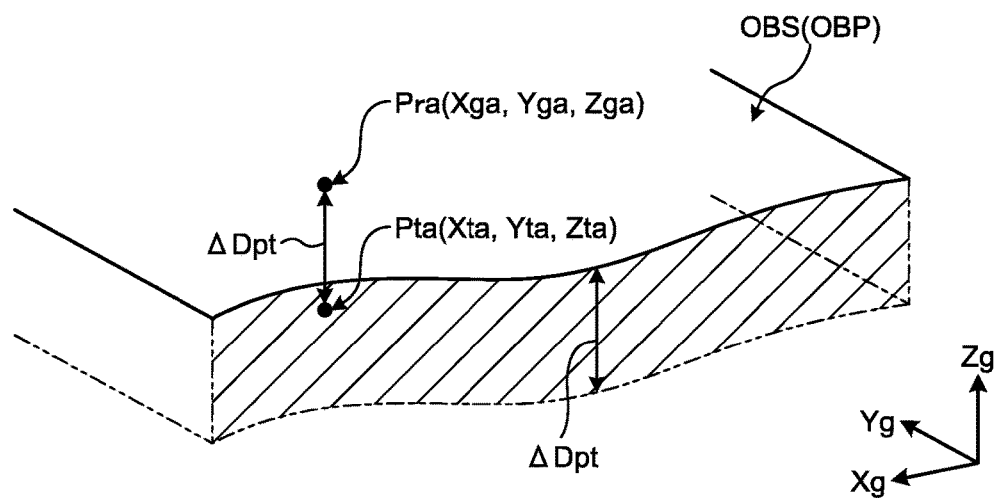
FIG. 17 is a view to describe target construction information generated by the control system of the work machine according to the first embodiment.
Figure 18:
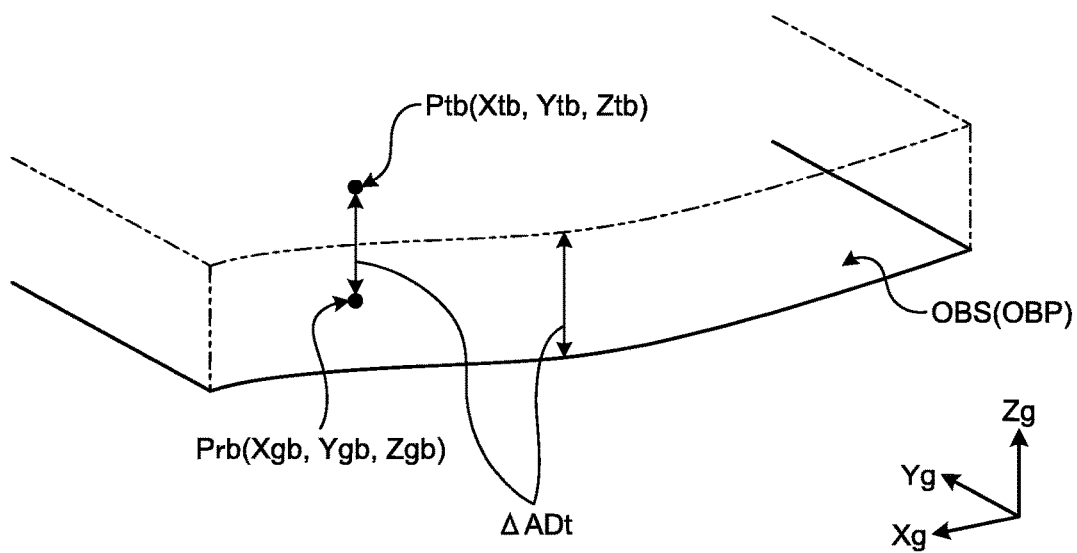
FIG. 18 is a view to describe target construction information generated by the control system of the work machine according to the first embodiment.
Figure 19:
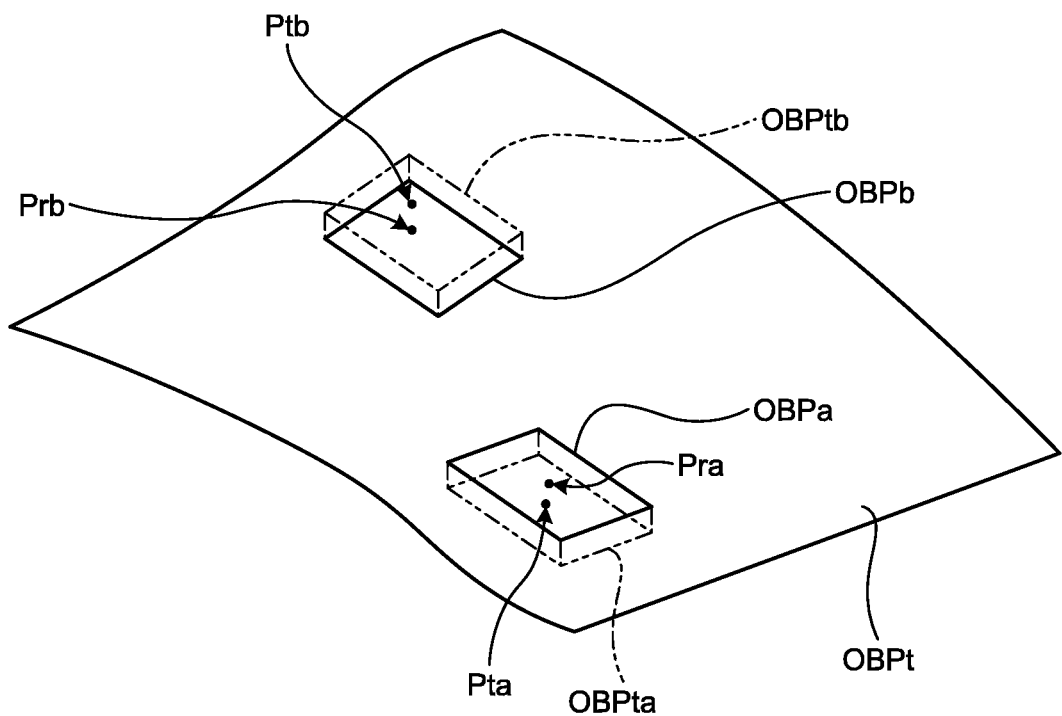
FIG. 19 is a view to describe target construction information generated by the control system of the work machine according to the first embodiment.

FIGS. 17, 18, and 19 are views to describe target construction information generated by the control system 50 of the work machine according to the first embodiment. In the present embodiment, the construction information generating device 52 illustrated in FIG. 3 uses shape information generated by the detection processing device 51 to obtain target construction information, specifically, positional information on a targeted shape when a construction object OBP is constructed. In the present embodiment, the construction information generating device 52 changes a position on a surface OBS and obtains target construction information by processing information included in the shape information and indicating the position on the surface OBS of the construction object OBP as illustrated in FIGS. 11 and 12.

The example illustrated in FIG. 17 illustrates exemplary construction in which a range of a distance ΔDPt is removed from the surface OBS of the construction object OBP. In this case, the construction information generating device 52 obtains a position Pta (Xta, Yta, Zta) obtained by lowering a position Pra (Xga, Yga, Zga) on the surface OBS of the construction object OBP by the distance ΔDPt. In the present embodiment, the construction information generating device 52 moves the position Pra (Xga, Yga, Zga) to the position lowered by the distance ΔDPt by subtracting ΔDPt from Zga the position Pra (Xga, Yga, Zga). Therefore, the position Pta (Xta, Yta, Zta) becomes a position Pta (Xga, Yga, Zga−ΔDPt). The position Pta (Xta, Yta, Zta) thus obtained becomes the target construction information. The construction information generating device 52 acquires shape information, in the present embodiment, a data file EMD, from the detection processing device 51 illustrated in FIG. 3, and generates target construction information for every position Pr (Xg, Yg, Zg) included in the data file EMD by subtracting ΔDPt from a value of Zg.

The example illustrated in FIG. 18 illustrates exemplary construction in which objects such as earth, sand, or rocks are banked in a range of a distance ΔADt from the surface OBS of the construction object OBP. In this case, the construction information generating device 52 obtains a position Ptb (Xtb, Ytb, Ztb) obtained by raising a position Prb (Xgb, Ygb, Zgb) on the surface OBS of the construction object OBP by the distance ΔADt. In the present embodiment, the construction information generating device 52 moves the position Prb (Xgb, Ygb, Zgb) to a position raised by the distance ΔADt by adding ΔADt to Zg of the position Prb (Xgb, Ygb, Zgb). Therefore, the position Ptb (Xtb, Ytb, Ztb) becomes the position Ptb (Xtb, Ytb, Zgb+ΔADt). The position Ptb (Xtb, Ytb, Ztb) thus obtained becomes the target construction information. The construction information generating device 52 acquires shape information, in the present embodiment, a data file EMD from the detection processing device 51 illustrated in FIG. 3, and generates target construction information for every position Pr (Xg, Yg, Zg) included in the data file EMD by adding ΔADt to a value of Zg.

Thus, the construction illustrated in FIGS. 17 and 18 is construction in which the surface OBS of the construction object OBP is changed (offset) to the certain depth (ΔDpt) or the certain height (ΔADt). Additionally, the control system 50 may be applied to construction in which, for example, a slope having a predetermined inclination is provided on the surface OBS of the construction object OBP. Such construction is carried out in a case of performing construction such that a topography after construction becomes a well-drained topography. After the detection processing device 51 generates shape information on the basis of images captured by at least one pair of imaging devices 30, the construction information generating device 52 subtracts or adds a predetermined distance from/to a Zg coordinate of a position of the surface OBS indicated by the shape information, and generates target construction information indicating that a predetermined slope is provided with respect to the surface OBS. In this case also, the construction information generating device 52 obtains the target construction information by changing a position on the surface OBS by processing information indicating the position of the surface OBS of the construction object OBP included in the shape information.

In a case where the construction site is large, construction objects OBPa, OBPb captured by at least the one pair of imaging devices 30 may be portions of the construction object OBPt of the entire construction site as illustrated in FIG. 19. Ranges OBPta, OBPtb in which positions Pta and Ptb obtained from positions Pra and Prb located on surfaces of the construction objects OBPa, OBPb are set as target construction information also become information on the portions of the entire construction site. The construction management device 57 can determine a soil amount to be removed from the construction object OBP or a soil amount to be banked on the construction object OBP can be obtained by using a difference between the shape information and the target construction information obtained from the shape information.

In a case where the construction management device 57 is provided in, for example, the management device 61 provided outside the excavator 1, the construction management device 57 acquires shape information from the excavator 1 via the communication device 25. The construction management device 57 acquires the soil amount to be removed from the construction object OBP or the soil amount to be banked on the construction object OBP by using the difference between the acquired shape information and the target construction information obtained from the shape information. In this case, the construction management device 57 acquires the shape information from the excavator 1 and generates the target construction information. The construction management device 57 may acquire the shape information and the target construction information from the excavator 1 to obtain the soil amount to be removed from the construction object OBP or the soil amount to be banked on the construction object OBP.

After generation of the target construction information, the construction information generating device 52 stores the generated information in the own storage unit. The target construction information stored in the storage unit of the construction information generating device 52 is used as a target value when the work unit control device 56 executes work unit control. In the present embodiment, the work unit control device 56 controls the work unit 2 of the excavator 1 such that the work unit 2, more specifically, the blade edge 8BT of the bucket 8 follows the target construction information. In other words, the work unit control device 56 moves the blade edge 8BT of the bucket 8 along a targeted shape indicated by the target construction information when the construction object is constructed. The construction management device 57 may transmit the target construction information generated by the construction information generating device 52 from the communication device 25 to at least one of the management device 61, mobile terminal device 64, and different work machine 70 illustrated in FIG. 3. Next, exemplary processing of a shape measuring method and a construction management method according to the present embodiment will be described.

<Exemplary Processing of Shape Measuring Method and Construction Management Method According to First Embodiment>

Figure 20:
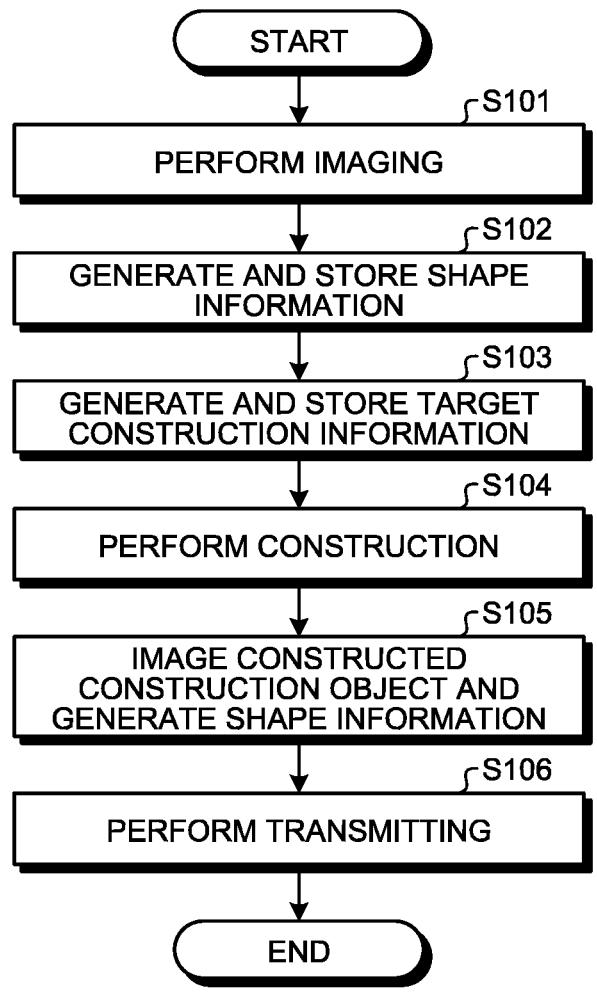
FIG. 20 is a flowchart illustrating exemplary processing of a shape measuring method, and a shape measuring method, and a construction management method according to the first embodiment.

FIG. 20 is a flowchart illustrating exemplary processing of a shape measuring method and a construction management method according to the first embodiment. The excavator 1 having the control system 50 executes the shape measuring method according to the present embodiment. More specifically, the control system 50 obtains shape information on a construction object OBP, and generates target construction information from the obtained shape information. Then, the control system 50 controls the work unit 2 so as to follow the obtained target construction information. The construction management system 100, in the present embodiment, the management device 61 executes the construction management method according to the present embodiment.

When the imaging switch 32 illustrated in FIG. 3 is operated by an operator, an imaging command to cause imaging devices 30 to image the construction object OBP is received in the detection processing device 51 of the control system 50 from the imaging switch 32. When the imaging command is received, the detection processing device 51 causes at least the one pair of imaging devices 30 to image the construction object OBP in Step S101. In Step S102, the detection processing device 51 applies the image processing by the stereo method to images captured by at least the one pair of imaging devices 30, obtains position (three-dimensional positions) of the construction object OBP, and generates shape information on the construction object OBP by using the obtained position of the construction object OBP. The detection processing device 51 causes at least one of the own storage unit and the storage unit 57M of the construction management device 57 to store the generated target construction information. The method of generating shape information is as described above.

In Step S103, the construction information generating device 52 acquires the shape information from the detection processing device 51, and generates the target construction information. The construction information generating device 52 causes at least one of the own storage unit and the storage unit 57M of the construction management device 57 to store the generated target construction information. The method of generating the target construction information is as described above. In the present embodiment, the construction management device 57 illustrated in FIG. 3 transmits work information LG including the shape information obtained in Step S102 and the target construction information obtained in Step S102 to at least one of the management device 61 and the mobile terminal device 64.

In Step S104, the excavator 1 constructs the construction object OBP. At this point, the work unit control device 56 executes work unit control. In other words, the work unit control device 56 moves the blade edge 8BT of the bucket 8 along a targeted shape indicated by the target construction information at the time of constructing the construction object OBP.

In the present embodiment, the excavator 1 performs construction by executing work unit control on the basis of the target construction information to perform construction. In a construction site, a worker sometimes manually performs excavation and the like by using a work tool such as a shovel. In such a case, the worker may perform construction such as excavation while confirming the target construction information transmitted from the excavator 1 and acquired by the mobile terminal device 64.

After finishing the construction, in Step S105, the detection processing device 51 causes at least the one pair of the imaging devices 30 to image the constructed construction object OBP and generates shape information by using obtained images. Next, in Step S106, the construction management device 57 transmits post-construction shape information generated by the detection processing device 51 to the management device 61 via the communication device 25 illustrated in FIG. 3. The construction management device 57 may transmit the post-construction shape information to the mobile terminal device 64 illustrated in FIG. 3 via the communication device 25. The management device 61 having acquired the post-construction shape information may transmit the post-construction shape information to the mobile terminal device 64 illustrated in FIG. 3 via the communication device 62. In the flowchart illustrating the exemplary processing of the construction method illustrated in FIG. 20, Step S106 and Step S107 may not be necessarily executed.

In the present embodiment, since time information TM is attached to shape information, progress of construction can be displayed by at least one of the management device 61 and the mobile terminal device 64 displaying, for a predetermined execution site, pieces of shape information before and after construction transmitted from the control system 50 on a screen of at least one of the display devices included in the display device 67 and the mobile terminal device 64. Additionally, daily progress of construction is displayed in an easy-to-understand manner by at least one of the management device 61 and the mobile terminal device 64 causing the screen of at least one of the display devices included in the display device 67 and the mobile terminal device 64 to: display pieces of the shape information on the construction site in time series; display the pieces of the shape information by frame-by-frame playback; or display a numerical value of a coordinate of a position Pr. In a case where the construction management device 57 of the excavator 1 can also obtain pieces of shape information on the construction site in time series from the management device 61, the construction management device 57 can also cause the screen 58D of the display device 58 to display the pieces of shape information on the construction site in time series. In other words, at least one of the management device 61, mobile terminal device 64, construction management device, and construction management device 57 includes a display device to display, in time series, pieces of topography information on the entire construction site of the work machine by using a plurality of pieces of shape information to which pieces of time information are attached.

In the present embodiment, the construction management device 57 may transmit not only the post-construction shape information but also target construction information to at least one of the management device 61 and the mobile terminal device 64 via the communication device 25. In a case where the post-construction shape information and the target construction information are transmitted only to the management device 61 from the excavator 1, the management device 61 may transmit the post-construction shape information and the target construction information to the mobile terminal device 64 via the communication device 62. With such transmission, at least one of the management device 61 and the mobile terminal device 64 can display the post-construction shape information and the target construction information on the screen of the display device 67 in a parallel or in a superimposed manner, and therefore, a manager and the like can quickly and easily confirm the progress of construction.

Modified Example of Object Detecting Method

A modified example of a method in which at least one pair of imaging devices 30 of the excavator 1 detects an object will be described. At least the one pair of imaging devices 30 is mounted on the swing body 3 of the excavator 1. The detection processing device 51 can acquire shape information on an entire periphery of the excavator 1 by at least the one pair of the imaging devices 30 imaging an object while swinging the swing body 3.

In a case where at least the one pair of the imaging devices 30 images the object while swinging the swing body 3, the detection processing device 51 may stop swinging the swing body 3 at the timing of imaging the object. In this case, the swing body 3 is swung intermittently. In a case where at least the one pair of imaging devices 30 images the object while continuously swinging the swing body 3, imaging is performed as follows.

In the case where at least the one pair of imaging devices 30 images the object while continuously swinging the swing body 3, at least the one pair of the imaging devices 30 starts imaging at the same time when swinging of the swing body 3 is started, and imaging is finished by stopping swinging the swing body. Then, the detection processing device 51 may acquire shape information by performing the image processing by the stereo method on the basis of images obtained while swinging the swing body 3. In this case, for example, the detection processing device 51 receives a signal or an electric signal which is output in accordance with operation of an operating device to swing the swing body 3 out of the operating device 35 and indicates a change of a pilot pressure, and the detection processing device determines timing to start swinging the swing body 3 and timing to stop the swing, and then causes at least the one pair of the imaging devices 30 to perform imaging.

In a case where three-dimensional measurement is executed by the imaging devices 30 imaging the object while swinging the swing body 3, the detection processing device 51 generates time information TM every time a shutter of the imaging device 30 is clicked, and correlates each piece of the time information to a captured image. Furthermore, the detection processing device 51 may set, as the time information TM, a time when swinging of the swing body 3 is started or a time when swinging is stopped.

Since the control system 50 correlates each piece of shape information on the object imaged by at least one pair of imaging devices 30 to each piece of the time information obtained when the shape information is obtained, a current state of a work site can be obtained by combining the pieces of the shape information on the basis of the pieces of the time information.

The work machine like the excavator 1 often performs construction for a complex topography, and the imaging device 30 is often largely inclined with respect to an object to be imaged. In a case where an object is imaged at the same place at different timings, it is also assumed that an inclination of the ground in the place is changed due to execution of construction and the like. Since the one pair of imaging devices 30 is firmly mounted on the excavator 1 such that a relative positional relation is not deviated from each other while the excavator 1 is working, postures of the one pair of the imaging devices 30 are hardly changed according to a posture of the excavator 1.

In the present embodiment, the control system 50 obtains shape information by using the posture of the excavator. At this point, the control system 50 converts three-dimensional positional information obtained by the imaging device 30 to three-dimensional positional information in the global coordinate system by using a detected value of the IMU 24 and an azimuth of the excavator obtained from the position of the excavator 1 detected by the position detecting device 23. The three-dimensional positional information after conversion becomes the shape information. With such processing, influence of the inclination of the excavator 1 is suppressed and comparison between topographies before and after construction and the like can be appropriately performed with the shape information obtained by the control system 50.

The control system 50 can obtain the shape information on the work site, specifically, the three-dimensional positional information on the work site by imaging the work site with the imaging device 30. Since the control system 50 is provided in the excavator 1, the control system 50 can be moved to various places of the work site to obtain shape information. A state of the work site and a change of the state of the work site can be grasped by combining a plurality of pieces of shape information obtained as described above on the basis of pieces of the time information. As a result, the management device 61 manages construction conditions by using the detection results obtained by the excavator 1 that is the work machine having: at least the one pair of the imaging device 30 serving as detecting devices to detect the position of the object; and the detection processing device 51.

For example, the management device 61 can obtain a construction state of the construction site within a range that can be deemed as a same time by extracting and combining a plurality of different pieces of shape information obtained within the range that can be deemed as the same time. For example, progress of construction is grasped by obtaining a plurality of construction states of the construction site within the range that can be deemed as the same time. Thus, the management device 61 can manage the construction conditions of the construction site where a work machine having an imaging device 30 and a detection processing device 51 and a work machine not having an imaging device 30 and a detection processing device 51 exist mixed. Thus, in a case where there is one excavator 1 having the control system 50 in a work site, the excavator 1 can generate shape information not only for an own construction object but also for a construction object for a different work machine, and therefore, the progress of construction in the entire construction site can be managed and also achievement of a work amount can be managed.

The control system 50 detects a construction object by using at least one pair of imaging devices 30 provided in the excavator 1, obtains shape information on the construction object from at least one pair of images corresponding to a detection result, and obtains, from the obtained shape information, shape information that is information on a targeted shape at the time of constructing the object. Therefore, the control system 50 eliminates necessity of work in which a worker obtains a shape of an object by surveying a construction object by using a surveying instrument or the like in a construction site, and also eliminates necessity of work to generate a targeted shape on the basis of the obtained construction object, in other words, work to design information on the targeted shape. As a result, the control system 50 can reduce labor to survey a current topography of the construction object and labor to obtain the targeted shape at the time of constructing the construction object. As far as the imaging device 30 can perform imaging, the control system 50 can generate target construction information even in a place that can be hardly surveyed with a surveying instrument or the like, and therefore, construction to be performed by a work machine and manual construction such as excavation by a worker can be more efficiently performed. Additionally, since survey of the construction object can be performed by the control system 50, a burden on a worker who performs surveying in the construction site is reduced.

For example, in a case where there is target construction information on a construction object created by a design tool such as a computer aided design (CAD), a work machine may be needed to be moved to a place indicated by the target construction information, specifically, to a place to be constructed from now in order to perform construction by the work machine. The excavator 1 having the control system 50 has at least one pair of imaging devices 30, images a construction object to be constructed from now with at least the one pair of imaging devices 30, and generates target construction information on the basis of imaging results. Thus, the excavator 1 functions as a surveying instrument and also as a design tool. In other words, since the target construction information on the construction object can be generated in the place to be constructed, the work machine is not needed to be moved to the place to be constructed from now. As a result, a moving time and a designing period can be shortened, and therefore, working efficiency is improved.

In the present embodiment, the control system included in the excavator 1 generates shape information, but the management device 61 may also generate the shape information. In this case, a result obtained by applying the image processing by the stereo method to images captured by the one pair of imaging devices 30, information needed to obtain information indicating a posture of the excavator 1, a position in the global coordinate system of the excavator 1, and other shape information are transmitted to the management device 61 via the communication device 25.

Since the work machine like the excavator 1 is moved in the construction site, there are various inclinations imaged by at least the one pair of imaging devices 30 in the site, and also an inclination of a place to be imaged may also be changed with time due to construction. In such a construction site also, the control system 50 generates shape information by using the information indicating a posture of the excavator 1, in the present embodiment, a roll angle $\theta r$, a pitch angle $\theta p$, and an azimuth angle $\theta d$, and therefore, appropriate construction management can be achieved.

In the present embodiment, the control system 50 generates the shape information by using the roll angle $\theta r$, pitch angle $\theta p$, and azimuth angle $\theta d$ which indicate the posture of the excavator 1, but the one pair of imaging devices 30 may be supported by a mechanism in which postures of both the excavator and the imaging devices are kept constant while a relative positional relation of the one pair of imaging devices 30 is retained against a posture change of the excavator 1. In this case, for example, the one pair of imaging devices 30 is supported by the mechanism in which base lines of the one pair of imaging devices 30 are constantly kept horizontal.

In the present embodiment, the control system 50 generates shape information for a range to be constructed by the excavator 1 having the control system 50 and a work machine not having the control system 50 and a range after construction is performed, but a range for which the control system 50 generates shape information is generated is not limited to thereto. For example, the control system 50 can also generate shape information for a range constructed by a worker who executes work such as excavation with a shovel or the like in a construction site, or a range to be used for construction from now. This enables the control system 50 and the construction management system 100 having the control system 50 to manage construction conditions of an entire construction site. As described above, the control system 50 can also obtain an excavated soil amount or a banked soil amount by a worker using a shovel or the like from a difference between pieces of shape information before and after construction.

In the present embodiment, the control system 50 is provided in the excavator 1 that is a work machine, but a system to generate shape information and generate target construction information may also be provided in a surveying vehicle. For example, in a case of generating shape information, at least one pair of imaging devices 30 and a detection processing device 51 are provided in the surveying vehicle. In a case of generating target construction information in addition to the shape information, not only at least the one pair of the imaging device 30 and the detection processing device 51 but also a construction information generating device 52 is provided in the surveying vehicle. In either case, it is preferable that the surveying vehicle has a communication device 25 capable of communicating with at least one of a work machine working in a construction site, the management device 61, and the mobile terminal device 64.

In the present embodiment, the image processing by the stereo method may also be performed outside the excavator 1, for example, by at least one of the management device 61 of the management facility 60 and the mobile terminal device 64. In this case, for example, one pair of images of an object captured by at least the one pair of imaging devices 30 is transmitted to at least one of the management device 61 and the mobile terminal device 64 via the communication device 25, and at least one of the management device 61 and the mobile terminal device 64 applies the image processing by the stereo method to the images of the object.

In the present embodiment, generation of shape information may also be performed outside the excavator 1, for example, by at least one of the management device 61 of the management facility 60 and the mobile terminal device 64. In particular, conversion using a roll angle θr, a pitch angle θp, and an azimuth angle θd indicating a posture of the excavator 1 may also be performed outside the excavator 1, for example, by at least one of the management device 61 of the management facility 60 and the mobile terminal device 64. In this case, information obtained by applying the image processing by the stereo method to one pair of images of the object imaged by at least the one pair of imaging devices 30 is transmitted together with the roll angle θr, pitch angle θp, and azimuth angle θd via the communication device 25 to the outside of the excavator 1, for example, to at least one of the management device 61 of the management facility 60 and the mobile terminal device 64.

In the present embodiment, a position Ps of a construction object OBP obtained from the images captured by at least the one pair of imaging devices 30 is obtained first, and then converted to a position Pg of the global coordinate system, and at the same time, an inclination caused by the posture of the excavator may be corrected. In the present embodiment, for example, when the IMU 24 detects at least one of swinging of the swing body 3 of the excavator 1 and movement of the excavator 1, the control system 50 may execute control so as to prohibit imaging by the imaging device 30 or stops the detection processing device 51 from generating shape information. In the present embodiment, the excavator 1 may transmit shape information to the different work machine 70, and the different work machine 70 may generate target construction information.

The configuration disclosed in the present embodiment can also be suitably applied to following embodiments.

Second Embodiment

In a second embodiment, an excavator 1 that is a work machine having a control system 50 acquires information on a construction object OBP and generates at least one of shape information and target construction information in a construction site where a plurality of work machines works. Then, the excavator 1 transmits the generated target construction information to a different work machine, specifically, a work machine other than the excavator 1. The excavator 1 and the different work machine construct the construction object OBP by using the target construction information generated by the excavator 1. The different work machine may be, for example, a bulldozer, a wheel loader, or a grader besides a different work machine 70 illustrated in FIG. 3. The different work machine may include a control system 50. Additionally, the different work machine may or may not include an imaging device 30. The different work machine includes at least a communication device.

Figure 21:
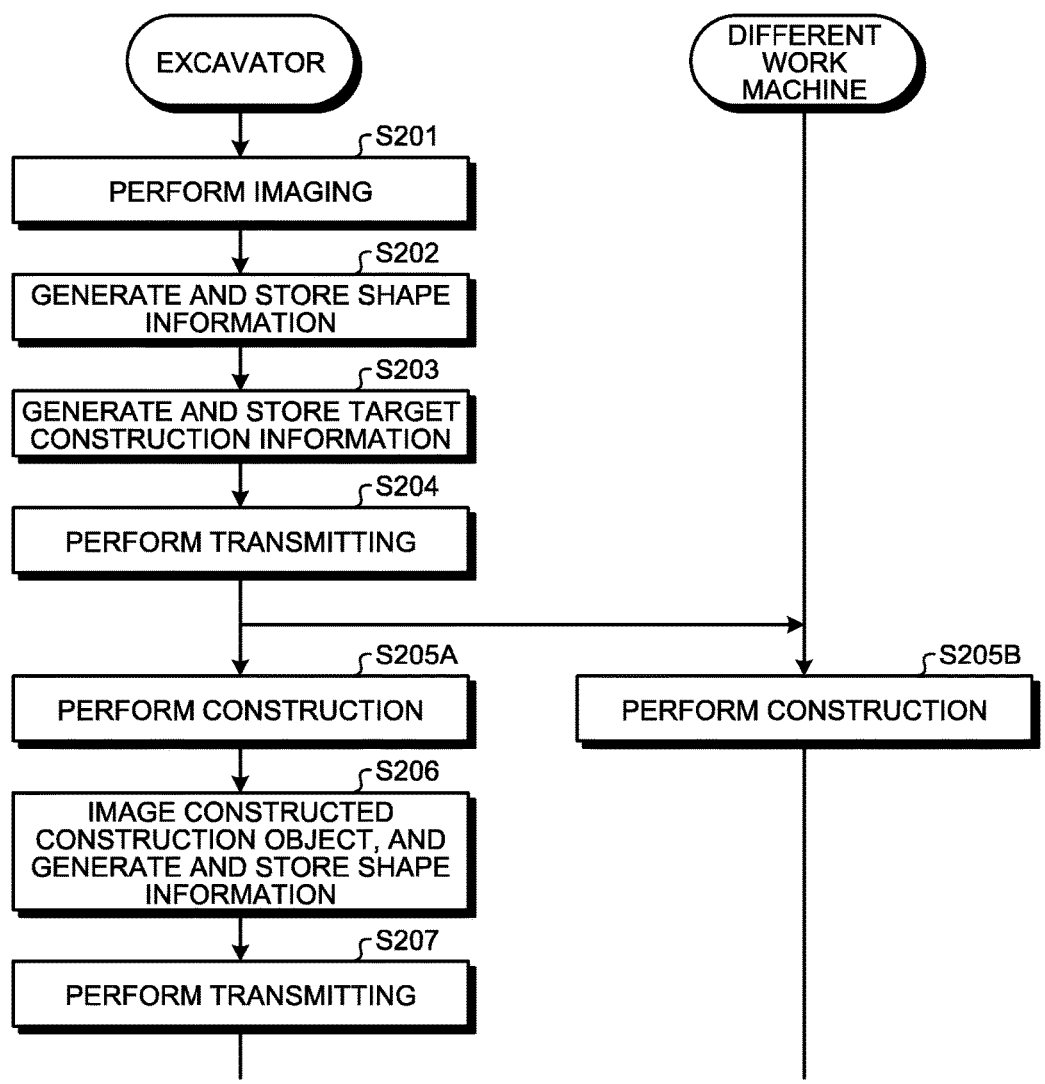
FIG. 21 is a flowchart illustrating exemplary processing of a shape measuring method and a construction management method according to a second embodiment.
Figure 22:
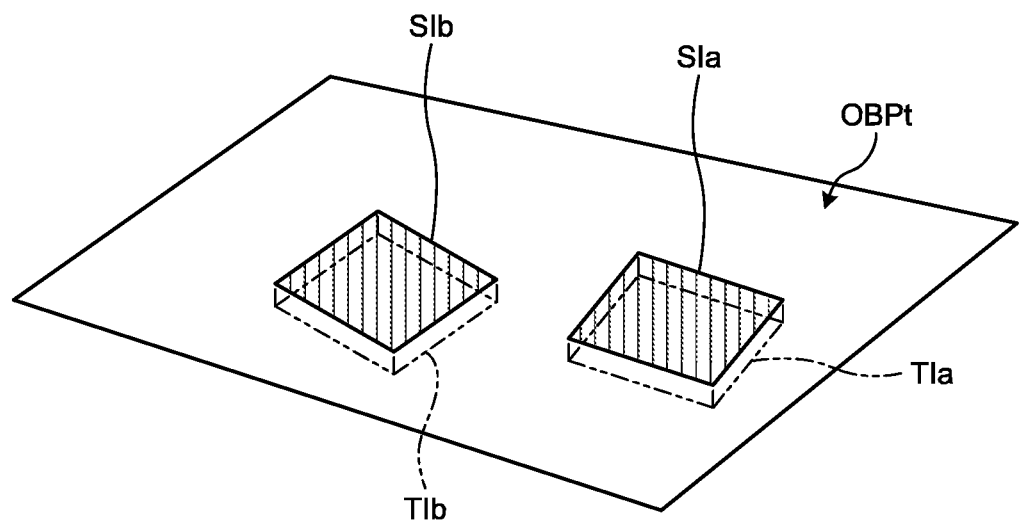
FIG. 22 is a view illustrating a relation between shape information and target construction information on a construction object.
Figure 23:
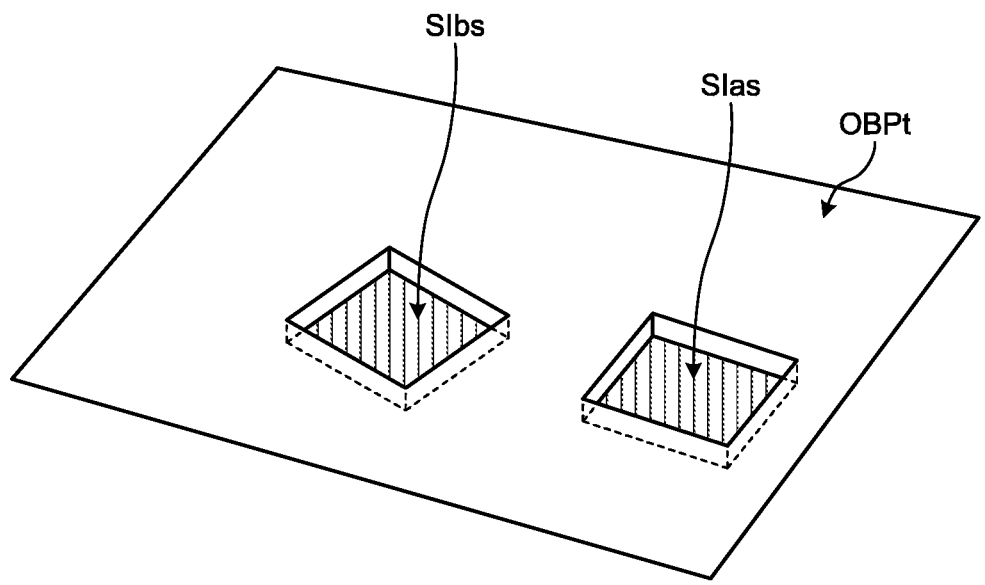
FIG. 23 is a view illustrating shape information after constructing the construction object.

FIG. 21 is a flowchart illustrating exemplary processing of a shape measuring method and a construction management method according to the second embodiment. FIG. 22 is a view illustrating a relation between pieces of shape information SIa, SIb of a construction object OBP and pieces of target construction information TIa, TIb. FIG. 23 is a view illustrating pieces of shape information SIas, SIbs after constructing the construction object OBP. The construction management method according to the present embodiment is implemented by the control system 50. In the present embodiment, the control system 50 also functions as a construction management system.

In the present embodiment and following embodiments, the excavator 1 having the control system 50 illustrated in FIG. 3 corresponds to a first work machine and the different work machine 70 corresponds to a second work machine. It is assumed that the different work machine 70 does not have the control system 50. Shape information and target construction information generated from the shape information are stored in at least one of a storage unit of apparatuses of the control system 50 and a storage unit of a management device 61.

When an imaging switch 32 illustrated in FIG. 3 is operated by an operator and an imaging command is received in a detection processing device 51, the detection processing device 51 causes at least one pair of imaging devices 30 to image the construction object OBP in Step S201. A range imaged by at least the one pair of imaging devices 30 is not only a range where the excavator 1 constructs, and a range constructed by the different work machine 70 working in a construction site is also imaged. Additionally, a range constructed by a worker who works in the construction site may also be imaged. In other words, an object to be imaged by at least the one pair of imaging devices 30 included in the control system 50 includes at least: a construction planned portion different from a construction planned portion by the excavator 1 mounted with at least the one pair of imaging devices 30; and a constructed portion different from a constructed portion by the excavator 1. At least one of a construction planned portion and a constructed portion by a means other than the excavator 1, for example, a means like a shovel by a worker may also be included in an object to be imaged by at least the one pair of the imaging devices 30. In other words, the object to be imaged by at least the one pair of imaging devices 30 included in the control system 50 may include at least one of the construction planned portion by a means other than the excavator 1 and a constructed portion by the means other than the excavator 1. The excavator 1 may be moved around the construction site or the swing body 3 may be swung in order to image a range to be constructed by the different work machine 70.

In Step S202, the detection processing device 51 applies image processing by a stereo method to images captured by at least the one pair of imaging devices 30, obtains a position (three-dimensional position) of the construction object OBP, and generates shape information on the construction object OBP by using the obtained position of the construction object OBP. As illustrated in FIG. 22, the shape information SIa is generated from the construction object OBP of the excavator 1, and the shape information SIb is generated from the construction object OBP of the different work machine 70. The detection processing device 51 causes at least one of an own storage unit and a storage unit 57M of a construction management device 57 to store the generated pieces of shape information SIa, SIb. A method of generating the shape information is as described in a first embodiment.

In Step S203, a construction information generating device 52 acquires the pieces of shape information SIa, SIb from the detection processing device 51, and generates the pieces of target construction information TIa, TIb. The target construction information TIa is generated from the shape information SIa and the target construction information TIb is generated from the shape information SIb. A method of generating the target construction information is as described in the first embodiment. The construction information generating device 52 causes at least one of the own storage unit and the storage unit 57M of the construction management device 57 to store the generated target construction information. In this case, all of the generated pieces of target construction information, specifically, the target construction information on the construction object OBP of the excavator 1 and the target construction information on the construction object OBP of the different work machine 70 are stored in a storage unit of the construction information generating device 52. In Step S203, the control system 50 may not store the target construction information in the storage unit and may perform control to transmit target construction information to the different work machine immediately after generation thereof in order to execute next Step S204.

In Step S204, the construction information generating device 52 or the construction management device 57 transmits the target construction information to the different work machine 70 via a communication device 25 illustrated in FIG. 3. In Step S205A, the excavator 1 constructs the construction object OBP by using the generated target construction information. In Step S205B, the different work machine 70 constructs the construction object OBP by using the target construction information acquired from the excavator 1. In Steps S205A and S205B, each of the excavator 1 and the different work machine 70 includes a work unit control device 56, and can execute work unit control in accordance with the target construction information. Each of the excavator 1 and the different work machine 70 moves a blade edge 8BT of a bucket 8 and a work unit along a targeted shape indicated by the target construction information at the time of constructing the construction object OBP.

In this case, in a case where the different work machine 70 includes the control system 50, movement of the work unit may be controlled in accordance with the acquired target construction information. In a case where the different work machine 70 does not include the control system 50, the target construction information is displayed on a display device provided in the different work machine 70, and an operator can operate the work unit while viewing the target construction information displayed on the display device.

After finishing the construction, in Step S206, the detection processing device 51 causes at least the one pair of imaging devices 30 to image the constructed construction object OBP, and generates the shape information SIas illustrated in FIG. 23 by using the obtained images. At this point, the detection processing device 51 generates the shape information SIbs illustrated in FIG. 23 by also imaging the construction object OBP constructed by the different work machine. The detection processing device 51 causes at least one of the own storage unit and the storage unit 57M of the construction management device 57 to store the generated shape information.

The excavator 1 may be also moved around the construction site or the swing body 3 may be swung in order to image the range constructed by the different work machine 70. Next, in Step S207, the construction management device 57 transmits post-construction shape information generated by the detection processing device 51 to the management device 61 via the communication device 25. Similar to the first embodiment, the construction management device 57 may transmit the post-construction shape information to the mobile terminal device 64 illustrated in FIG. 3, and not only the post-construction shape information but also the target construction information may be transmitted to at least one of the management device 61 and the mobile terminal device 64 via the communication device 25. In the present embodiment, Step S206 and Step S207 may not be necessarily executed in the flowchart illustrating the exemplary processing of the construction method illustrated in FIG. 21.

In the present embodiment, at least one work machine having the control system 50, in the present embodiment, the excavator 1 obtains pieces of shape information on construction objects of the own machine and the different work machine 70 existing in the construction site. Therefore, the management device 61 can manage construction conditions of the construction site by using the pieces of shape information obtained by the excavator having the control system. Since the control system 50 can generate pieces of shape information on not only the construction object of the work machine but also on the construction object by a worker who works in the construction site, surveying on the construction object by a worker becomes unnecessary. As a result, the construction conditions of the entire construction site can be easily managed.

Since the control system 50 attaches time information to each piece of the generated shape information, the shape information and time information are handled in a correlated manner in the construction management system 100. Therefore, the management device 61 can extract a plurality of pieces of shape information used to manage the construction conditions on the basis of the time information. For example, the management device 61 can obtain a construction state of the construction site within a range that can be deemed as a same time by extracting and combining a plurality of different pieces of shape information obtained within the range that can be deemed as the same time. For example, progress of construction is grasped by obtaining a plurality of construction states of the construction site within the range that can be deemed as the same time. Thus, the construction management system 100 can manage the construction conditions of the construction site where a work machine having the imaging device 30 and the detection processing device 51 and a work machine not having the imaging device 30 and the detection processing device 51 exist mixed.

In the present embodiment, the work machine having the control system 50, in the present embodiment, the excavator 1 generates target construction information on a construction object of the different work machine 70 existing in the construction site. Therefore, in a case where at least one work machine having the control system 50 exists in a construction site, this work machine generates shape information and target construction information on the construction site and a different work machine can perform construction by using the generated target construction information. As a result, efficiency at the time of constructing a construction site with a plurality of work machines without having target construction information is improved, for example.

The configuration disclosed in the present embodiment can also be suitably applied to following embodiments.

Third Embodiment

In a third embodiment, an excavator 1 having a control system 50 acquires information on a construction object OBP, generates shape information and target construction information, and transmits the generated shape information to a management device 61 of a management facility 60 and a different work machine 70 illustrated in FIG. 3 in a construction site where the excavator 1 works.

FIG. 24 is a flowchart illustrating exemplary processing of a shape measuring method and a construction management method according to the third embodiment. The construction management method according to the present embodiment is implemented by at least the control system 50 and the management device 61. In the present embodiment, the control system 50 and the management device 61 also function as construction management systems.

When an imaging switch 32 illustrated in FIG. 3 is operated by an operator and an imaging instruction is received in a detection processing device 51, the detection processing device 51 causes at least one pair of imaging devices 30 to image a construction object OBP in Step S301. A range imaged by at least the one pair of imaging devices 30 is not only a range where the excavator 1 constructs, and a range constructed by the different work machine 70 working in a construction site is also imaged. The excavator 1 may be moved around the construction site in order to image a range to be constructed by the different work machine 70.

In Step S302, the detection processing device 51 applies image processing by a stereo method to images captured by at least the one pair of imaging devices 30, obtains a position (three-dimensional position) of the construction object OBP, and generates shape information on the obtained construction object OBP by using the obtained position of the construction object OBP. The detection processing device 51 causes at least one of an own storage unit and a storage unit 57M of a construction management device 57 to store the generated shape information. A method of generating the shape information is as described in a first embodiment.

In Step S303, the construction information generating device 52 acquires the shape information from the detection processing device 51 and generates target construction information. A method of generating the target construction information is as described in the first embodiment. The construction information generating device 52 causes at least one of the own storage unit and the storage unit 57M of the construction management device 57 to store the generated target construction information. In this case, all of the generated pieces of target construction information, specifically, the target construction information on the construction object OBP of the excavator 1 and the target construction information on the construction object OBP of the different work machine 70 are stored in a storage unit of the construction information generating device 52.

In Step S304, the detection processing device 51 or the construction management device 57 transmits the shape information to the management device 61 of the management facility 60 via a communication device 25 illustrated in FIG. 3. The construction information generating device 52 or the construction management device 57 transmits the target construction information to the different work machine 70. The construction information generating device 52 or the construction management device 57 may also transmit the target construction information to the management device 61. In Step S305, the management device 61 causes the storage unit 57M to store the shape information acquired from the excavator 1. In a case where the target construction information is also acquired from the excavator 1, the management device 61 causes the storage unit 57M to store the acquired target construction information.

In Step S306A, the excavator 1 constructs the construction object OBP by using the target construction information generated by the construction information generating device 52 of the control system 50. In Step S306B, the different work machine 70 constructs the construction object OBP by using the target construction information acquired from the excavator 1. In Step S306A and Step S306B, each of the excavator 1 and the different work machine 70 moves a blade edge 8BT of a bucket 8 and a work unit along a targeted shape indicated by the target construction information at the time of constructing the construction object OBP.

At least one of the excavator 1 and the different work machine may not include a work unit control device 56 and may be able to display, as a construction guidance image, a positional relation between the target construction information and an own work unit 2 on a screen 58D of a display device 58. As described in a second embodiment, an operator operates the work unit 2 along a shape indicated by the target construction information while viewing the screen 58D.

After finishing the construction, in Step S307, the detection processing device 51 of the excavator 1 causes at least one pair of the imaging devices 30 to image the constructed construction object OBP, and generates shape information by using the obtained images. At this point, the detection processing device 51 generates the shape information by also imaging the construction object OBP constructed by the different work machine. The detection processing device 51 causes at least one of the own storage unit and the storage unit 57M of the construction management device 57 to store the generated shape information. Next, in Step S308, the detection processing device 51 or the construction management device 57 transmits the post-construction shape information generated by the detection processing device 51 to the management device 61. At this point, the detection processing device 51 or the construction management device 57 may transmit the post-construction shape information to a mobile terminal device 64 illustrated in FIG. 3. In Step S309, the management device 61 having acquired the post-construction shape information causes a storage unit to store the post-construction shape information. The management device 61 may transmit the post-construction shape information to the mobile terminal device 64 illustrated in FIG. 3.

First Modified Example

FIG. 25 is a flowchart illustrating exemplary processing of a shape measuring method and a construction management method according to a first modified example of the third embodiment. The first modified example differs from the third embodiment in that the target construction information generated by the construction information generating device 52 of the control system 50 is transmitted to the different work machine 70 by the management device 61.

Steps S401 to S405 of the present modified example are the same as Steps S301 to S305 of the third embodiment. In Step S406, the management device 61 transmits target construction information acquired from the excavator 1 to the different work machine 70 via the communication device 62. Steps S407A and S407B to S410 are the same as Steps S406A and S406B to S409 of the third embodiment. The present modified example is effective in a case where communication between the management device 61 and a work machine in the construction site can be performed but communication between the excavator 1 and the different work machine 70 cannot be performed.

The present embodiment and the modified example thereof provide functions and effects similar to the second embodiment. The configuration disclosed in the present embodiment can also be suitably applied to following embodiments.

Fourth Embodiment

FIG. 26 is a flowchart illustrating exemplary processing of a shape measuring method and a construction management method according to a fourth embodiment. In the fourth embodiment, a management device 61 generates target construction information by using shape information transmitted from an excavator having a control system 50. A construction management method according to the present embodiment is implemented by at least the control system 50 and the management device 61. In the present embodiment, the control system 50 and the management device 61 also function as construction management systems.

Steps S501 and S502 of the fourth embodiment are the same as Steps S301 and S302 of a third embodiment. In Step S503, an excavator 1 transmits generated shape information to the management device 61 via a communication device 25. In Step S504, the management device 61 causes a storage unit to store the shape information acquired from the excavator 1. In Step S505, the management device 61 generates target construction information by using the shape information acquired output Step S504, and causes the storage unit to store the target construction information. In Step S506, the management device 61 transmits the generated target construction information to the excavator 1 via a communication device 62.

In Step S507, a construction management device 57 of the excavator 1 stores, in a storage unit 57M, the target construction information acquired via the communication device 25 and also transmits the same to a different work machine 70 via the communication device 25. In Steps S508A and S508B, each of the excavator 1 and the different work machine 70 moves a blade edge 8BT of a bucket 8 and a work unit along a targeted shape indicated by the target construction information at the time of constructing a construction object OBP. Steps S509 to S511 are the same as Steps S307 to S309 of the third embodiment.

First Modified Example

FIG. 27 is a flowchart illustrating exemplary processing of a shape measuring method and a construction management method according to a first modified example of the fourth embodiment. The first modified example differs from the fourth embodiment in that the target construction information generated by the management device 61 is transmitted to the excavator 1 and the different work machine 70 by the management device 61.

Steps S601 to S605 of the present modified example are the same as Steps S501 to S505 of the fourth embodiment. In Step S606, the management device 61 transmits the generated target construction information to the excavator 1 and the different work machine 70 via the communication device 62. Steps S606A and S606B to S610 are the same as Steps S507A and S507B to S511 of the fourth embodiment. The present modified example is effective in a case where communication between the management device 61 and a work machine in the construction site can be performed but communication between the excavator 1 and the different work machine 70 cannot be performed.

The present embodiment and the modified example thereof provide functions and effects similar to the second embodiment. Furthermore, in the present embodiment and the modified example thereof, a load to the control system 50 of the excavator 1, more specifically, the construction information generating device 52 can be reduced because the management device 61 generates the target construction information.

While the embodiments have been described above, note that the embodiments are not limited by the described content. Additionally, the components described above may include components readily conceivable by those skilled in the art, components substantially identical, and components included in a so-called equivalent range. The components described above can be suitably combined. At least one of various kinds of omission, replacement, and modification can be made for the components in the scope without departing from the gist of the embodiment. As far as the work machine is capable of constructing a construction object by performing excavating, transferring, and the like, the work machine is not limited to an excavator and may also be work machines like a wheel loader and bulldozer.

REFERENCE SIGNS LIST

1 EXCAVATOR
2 WORK UNIT
3 SWING BODY

4 OPERATOR'S COMPARTMENT
5 TRAVELING BODY
21, 22 ANTENNA
23 POSITION DETECTING DEVICE
25 COMMUNICATION DEVICE
30, 30a, 30b, 30c, 30d IMAGING DEVICE
32 IMAGING SWITCH
50 CONTROL SYSTEM FOR WORK MACHINE
51 DETECTION PROCESSING DEVICE
51A CALCULATION UNIT
51B INFORMATION ATTACHING UNIT
52 CONSTRUCTION INFORMATION GENERATING DEVICE
53 SENSOR CONTROL DEVICE
54 ENGINE CONTROL DEVICE
55 PUMP CONTROL DEVICE
56 WORK UNIT CONTROL DEVICE
57 CONSTRUCTION MANAGEMENT DEVICE
57M STORAGE UNIT
58 DISPLAY DEVICE
59 SIGNAL LINE
60 MANAGEMENT FACILITY
61 MANAGEMENT DEVICE
62 COMMUNICATION DEVICE
64 MOBILE TERMINAL DEVICE
67 DISPLAY DEVICE
70 DIFFERENT WORK MACHINE
100 CONSTRUCTION MANAGEMENT SYSTEM
EMD DATA FILE
ID POSTURE INFORMATION
LG WORK INFORMATION
NTW COMMUNICATION LINE
OBP CONSTRUCTION OBJECT
PR PROCESSING UNIT
MR STORAGE UNIT
IO INPUT/OUTPUT UNIT
TM TIME INFORMATION

The invention claimed is:

1. A construction management system comprising:
an object detecting unit mounted on a work machine and configured to detect an object in a construction site and output information on the object;
a shape detecting unit configured to output shape information indicating a three-dimensional shape of the object by using the information on the object detected by the object detecting unit;
a construction information generating unit configured to generate target construction information by using the shape information; and
a communication unit configured to transmit the target construction information.

2. The construction management system according to claim 1, wherein
the communication unit is further configured to transmit the target construction information to a work machine other than the work machine.

3. The construction management system according to claim 1, wherein the communication unit is further configured to transmit the the target construction information to a management device configured to communicate with the work machine.

4. The construction management system according to claim 1, wherein the object includes at least a construction planned portion different from a construction planned portion by the work machine, and a constructed portion different from a constructed portion by the work machine.

5. The construction management system according to claim 1, wherein a removed soil amount or a banked soil amount is obtained on the basis of pieces of the shape information obtained at different times.

6. The construction management system according to claim 1, wherein the shape detecting unit includes at least two imaging devices.

7. The construction management system according to claim 1, wherein
the object includes at least one of a construction planned portion and a constructed portion by a unit other than the work machine.

8. The construction management system according to claim 7, wherein a removed soil amount or a banked soil amount by a different work machine is obtained on the basis of pieces of the shape information obtained at different times.

9. The construction management system according to claim 7, wherein shape information on an entire construction site is generated by using at least one of a construction result by the work machine, a construction result by a different work machine, and a construction result by neither the work machine nor the different work machine.

* * * * *